April 5, 1955 D. A. GRIFFIN ET AL 2,705,741
TELEVISION CONTROL SYSTEM
Filed March 16, 1950
8 Sheets-Sheet 1
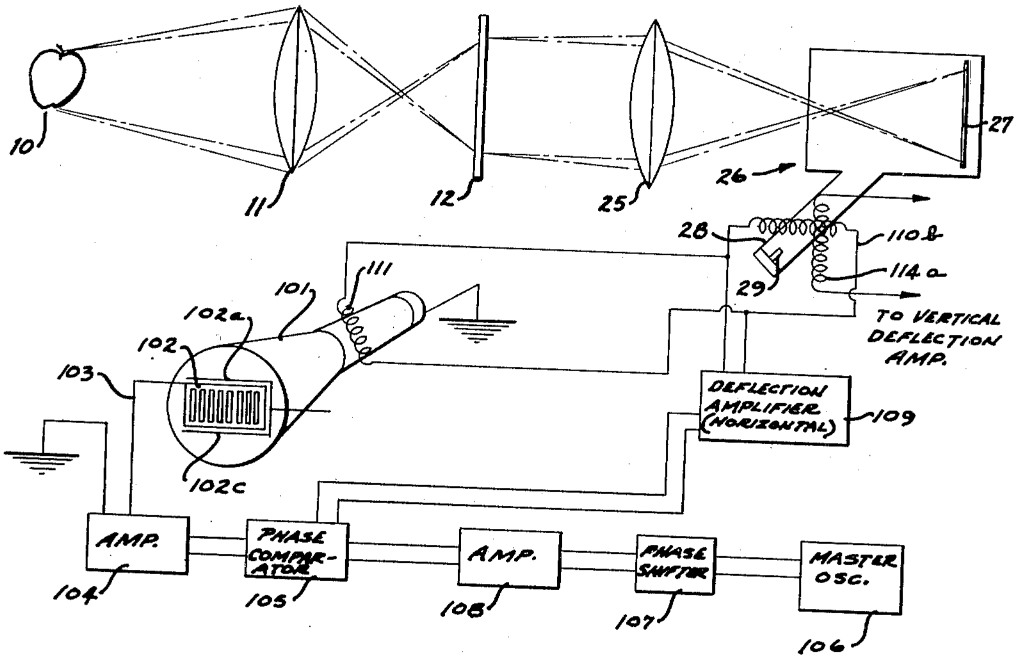
FIG. 1
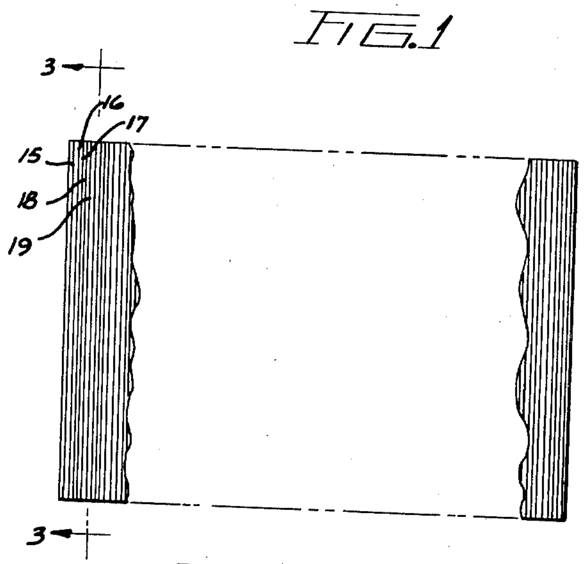
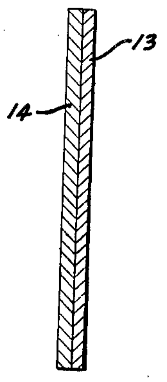
FIG. 2 FIG. 3
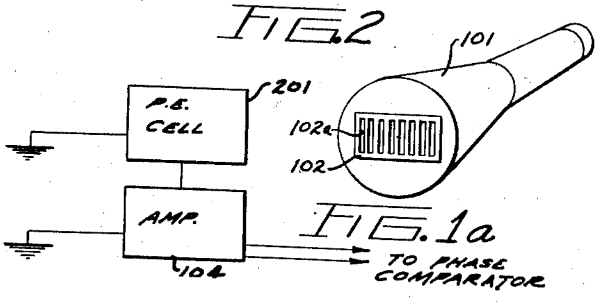
FIG. 1a
INVENTOR'S
DANA A. GRIFFIN
BRUNSON S. MC CUTCHEN
BY
C. A. Norton
ATTORNEY INVENTOR'S
DANA A. GRIFFIN
BRUNSON S. MC CUTCHEN
BY C. A. Norton
ATTORNEY INVENTORS
DANA A. GRIFFIN
BRUNSON S. MC CUTCHEN
BY C. A. Norton
ATTORNEY INVENTOR'S
DANA A. GRIFFIN
BRUNSON S. MC CUTCHEN
BY C. A. Norton
ATTORNEY INVENTOR'S
DANA A. GRIFFIN
BRUNSON S. MC CUTCHEN
BY
C. A. Norton
ATTORNEY INVENTORS
DANA A. GRIFFIN
BRUNSON S. MC CUTCHEN
BY C. A. Kinton
ATTORNEY April 5, 1955 D. A. GRIFFIN ET AL 2,705,741

TELEVISION CONTROL SYSTEM

Filed March 16, 1950 8 Sheets-Sheet 7

INVENTOR'S
DANA A. GRIFFIN
BRUNSON S. MC CUTCHEN
BY
C. G. Norton
ATTORNEY

INVENTOR'S
DANA A. GRIFFIN
BRUNSON S. MC CUTCHEN
BY C. A. Norton
ATTORNEY

United States Patent Office 2,705,741

Patented Apr. 5, 1955

2,705,741

TELEVISION CONTROL SYSTEM

Dana A. Griffin, North Plainfield, and Brunson S. McCutchen, Princeton, N. J., assignors to Communication Measurements Laboratory, Inc., New York, N. Y., a corporation of Delaware Application March 16, 1950, Serial No. 150,082

56 Claims. (Cl. 178—5.2)

This invention relates to a color television system, and more particularly to an all-electronic system involving no moving parts in either the transmitter or the receiver.

We are aware that a number of systems have been proposed for transmitting and receiving television in color. As far as we know, all of the systems heretofore proposed have disadvantages in one form or another. Many of them have serious color registry problems, and this is particularly true of systems employing three iconoscopes or orthicons in the transmitter and three kinescopes in the receiver, in which each individual iconoscope and kinescope handles approximately a third of the total visible light spectrum, and the picture at the receiver is produced by projecting red, green and blue light from the various kinescopes respectively on a screen for viewing. The difficulties of obtaining and maintaining color registry when more than one iconoscope and kinescope is used are tremendous.

Other systems, and this is particularly true of systems involving moving parts, such as rotating color filters, suffer from various forms of flicker. This flicker, termed color flicker, is extremely annoying.

In accordance with our invention, we dispense with moving parts, thereby eliminating all difficulties which result from the use of moving parts at the transmitter and/or receiver, and we eliminate the problems of registry of an image analyzed by a plurality of iconoscopes or reproduced by a plurality of kinescopes, by employing only a single iconoscope or orthicon having only one electron gun, at the transmitter, and a single kinescope having only a single electron gun at the receiver.

In accordance with one phase of our invention, we interpose in the optical system of the camera, at a focal plane therein, a stationary color filter of novel construction which modifies the image on the iconoscope screen from its natural color to one made up of a repeating pattern of narrow colored elemental areas each of a different primary color, such, for example, as green, red, blue, green, red, blue, and so on, with or without repeating uncolored areas interposed periodically in the repeating pattern.

When the electron beam scans the filtered image on the iconoscope screen, the iconoscope output is proportional to the colored light intensity of the particular filter color in successive elemental areas of the image, in the repeating pattern set by the sweep of the beam over the different filter colors in the respective areas of the image.

In accordance with another aspect of our invention, the received image is formed either by projection of white light through a similar filter, producing elemental areas of the image in the proper primary color to give correct color rendition to the image, or by energizing different color phosphors applied on the tube screen in the desired pattern, either in direct view or projection tubes.

In accordance with another aspect of our invention, we employ a new and improved system of control of the deflection of the electron beam at the transmitter and receiver which, so to speak, controls the receiver and transmitter scanning beams continuously at every point in every line in such a manner as to insure that when the transmitter is sending a signal for a particular color, the receiving beam is on a correspondingly colored section of the filter or screen.

In accordance with another aspect of our invention, we utilize a master oscillation and a locally generated control oscillation of the same frequency, and compare the phases of said oscillations, and we utilize the phase difference to control the deflection speed of the beam of the image transducer tube in a manner to maintain a constant phase relation between the master oscillation and the control oscillation.

In accordance with another aspect of our invention, we provide automatic control of beam sweep speed, raster position, and initiation of beam fly-back, in such a manner that any incipient departure of the beam from the desired condition introduces a correction to maintain desired conditions, and we accomplish this by the use of a control cathode ray tube with collector electrodes mounted therein for delivering control waves or pulses which control the correction applied.

Among the objects of our invention may be mentioned:

To provide an improved circuit affording extremely precise control of the sweep speed of an electron beam;

To provide an improved circuit affording precise control of the sweep speed of an electron beam to a degree of precision of the order of less than a quarter of a cycle at a frequency which may be as high as 8 megacycles or even higher;

To provide an improved system for controlling the sweep speed of an electron beam by causing the sweep of said beam to generate a periodic control wave having a multiplicity of peaks for each cycle of sweep, by comparing the phase of said control wave with that of another wave of the desired frequency, and controlling the sweep speed in accordance with the phase difference between said waves;

To provide such a system which is applicable in any system in which extremely precise control of the sweep speed of an electron beam is desired.

To provide such a system in which the control wave may be generated either through the action of the light emitted from the trace of the beam, or by the action of the beam itself impinging on target electrodes in the path of the beam;

To provide a television system, and more especially, a color television system, utilizing such a control system for the purpose of maintaining proper color rendering in a dot interlace or dot sequential system.

The features of novelty which we believe to be characteristic of our invention are set forth with particularity in the appended claims. Our invention itself, however, both as to its fundamental principles, and as to its particular embodiment will best be understood by reference to the specification and accompanying drawing, in which:

Fig. 1 is a diagrammatic view of one form of camera pick-up and control circuit for the transmitter;

Fig. 1*a* is a modification thereof;

Fig. 1*b* is a series of curves showing the phase relations which may obtain between the master oscillation and the control oscillation;

Figs. 2 and 3 are front and sectional views of one form of the color filter employed, in accordance with my invention;

Figures 8A, 8B:
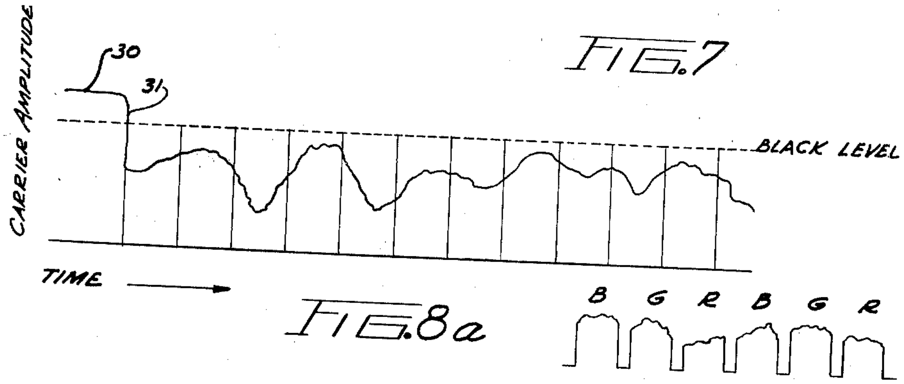
Figure 8C:
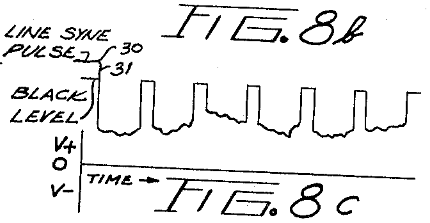

Figs. 8*a*, 8*b* and 8*c* are, respectively, the upper envelope of a carrier wave for a portion of a line of a monochrome picture as presently transmitted, a diagrammatic illustration of the iconoscope or orthicon output of a portion of one line of a color picture, in accordance with my system, and the envelope of the corresponding portion of the carrier transmitted.

Figure 9:
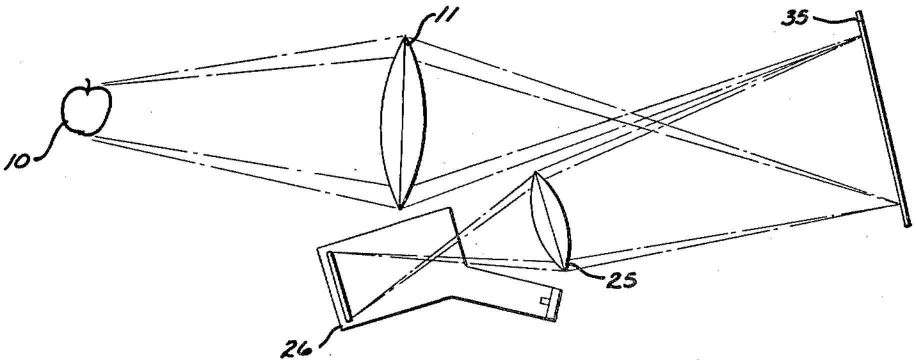
Figure 10:
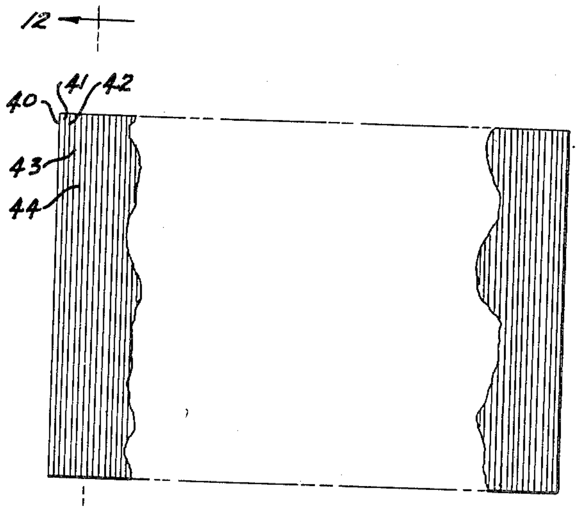
Figures 11, 12:
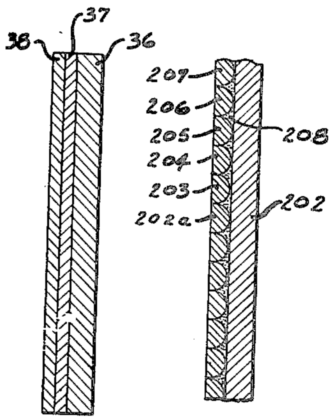
Figure 13:
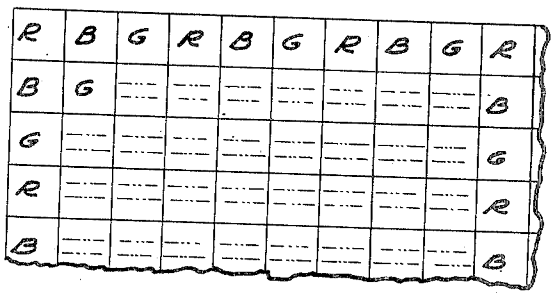
Figures 14, 15:
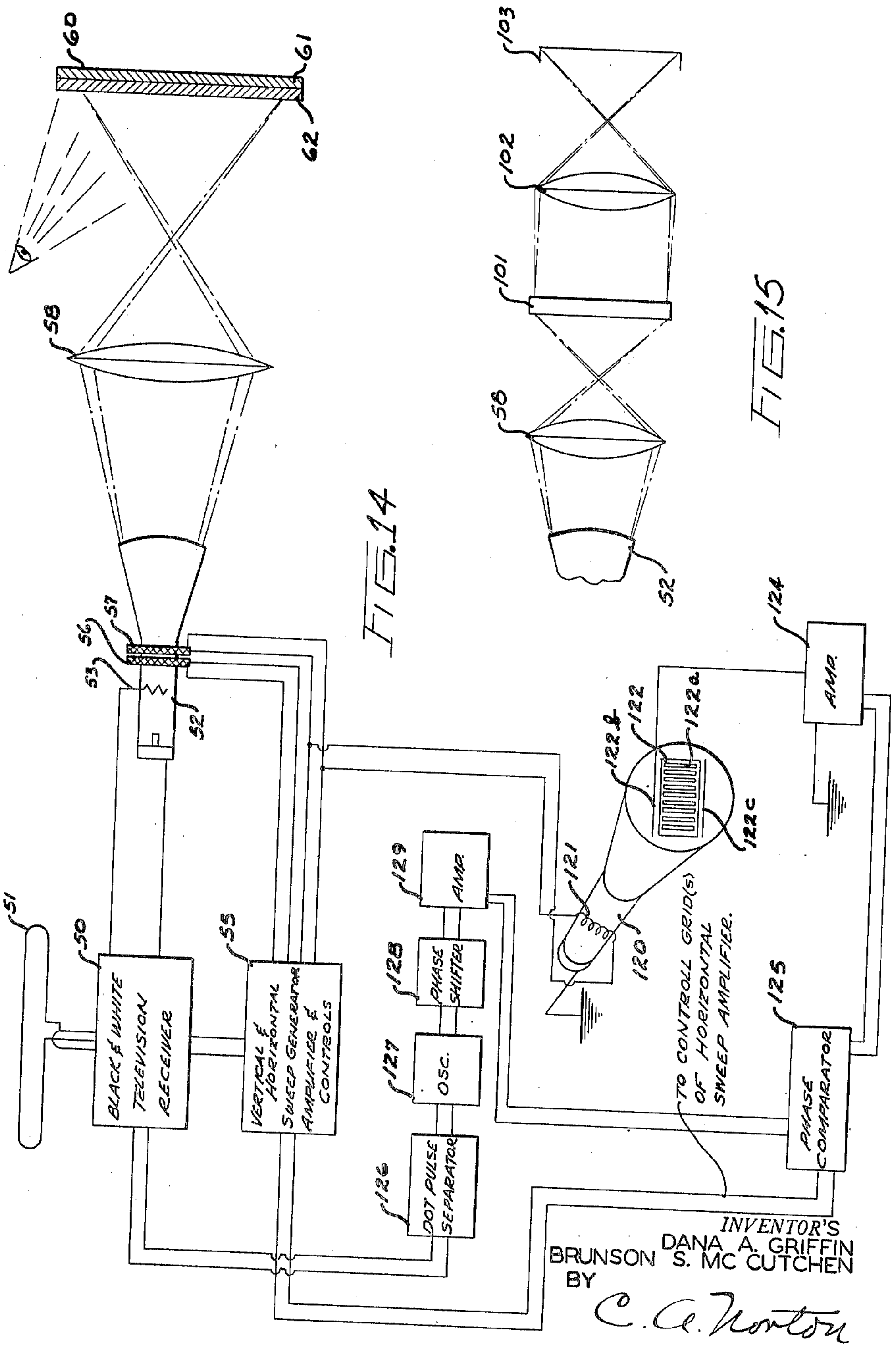
Figure 16:
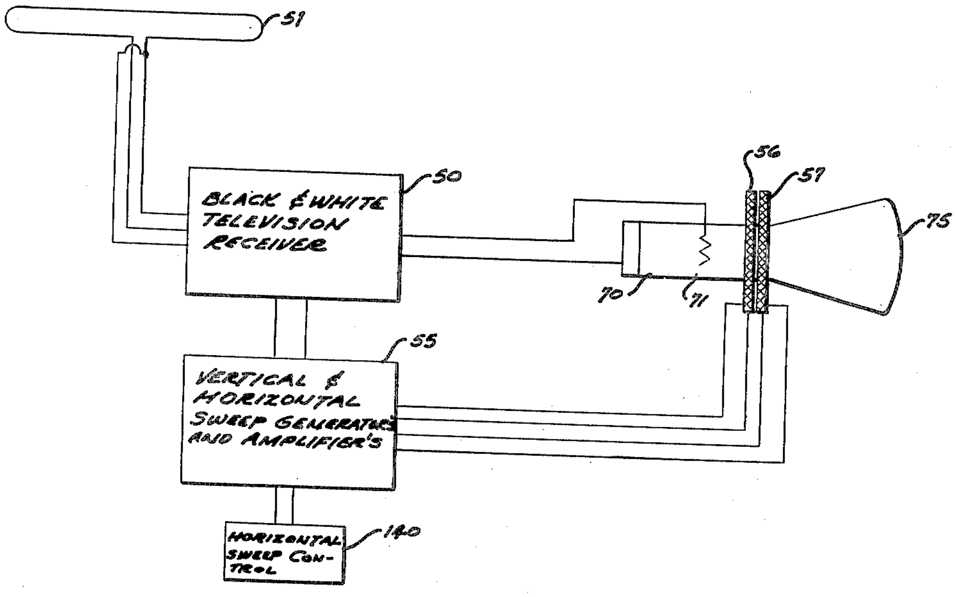
Figure 17:
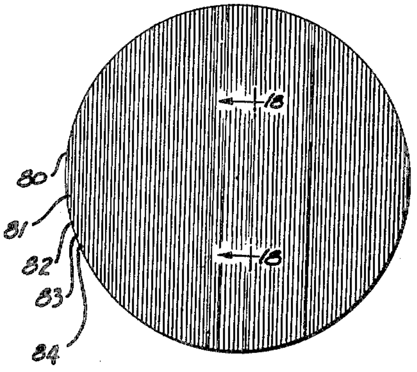

Fig. 9 is an alternative form of transmitter pick-up arrangement;

Figs. 10 and 11 are front and sectional views of the form of color filter employed in this modification;

Fig. 12 is a fragmentary transverse section of a modified form of filter mirror;

Fig. 13 is a diagrammatic representation of another form of color pattern that may be employed in accordance with our invention;

Fig. 14 is a diagrammatic view of a projection receiver in accordance with our invention;

Fig. 15 is a view showing an alternative projection system;

Fig. 16 is a similar view of a direct viewing receiver employing a novel kinescope tube, according to our invention;

Fig. 17 is a view of the face of the tube shown in Fig. 14, and

Figure 18:
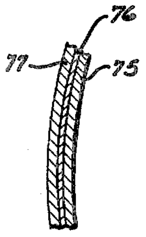

Fig. 18 is a sectional view of the same.

Figure 19:
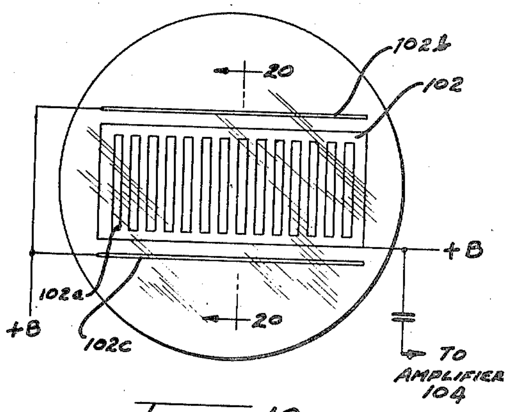
Figure 20:
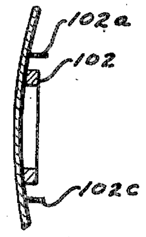
Figure 21:
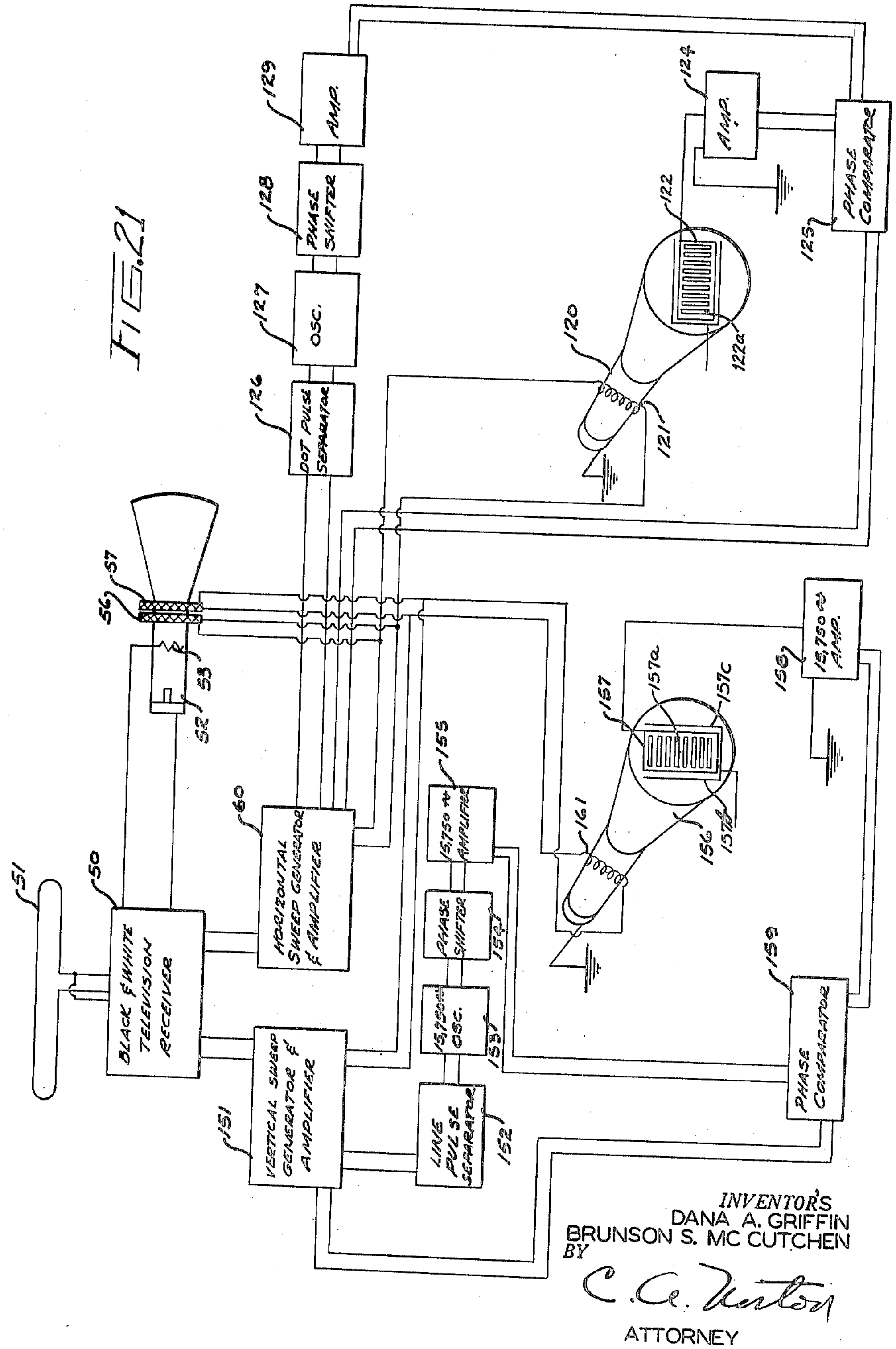
Figure 22:
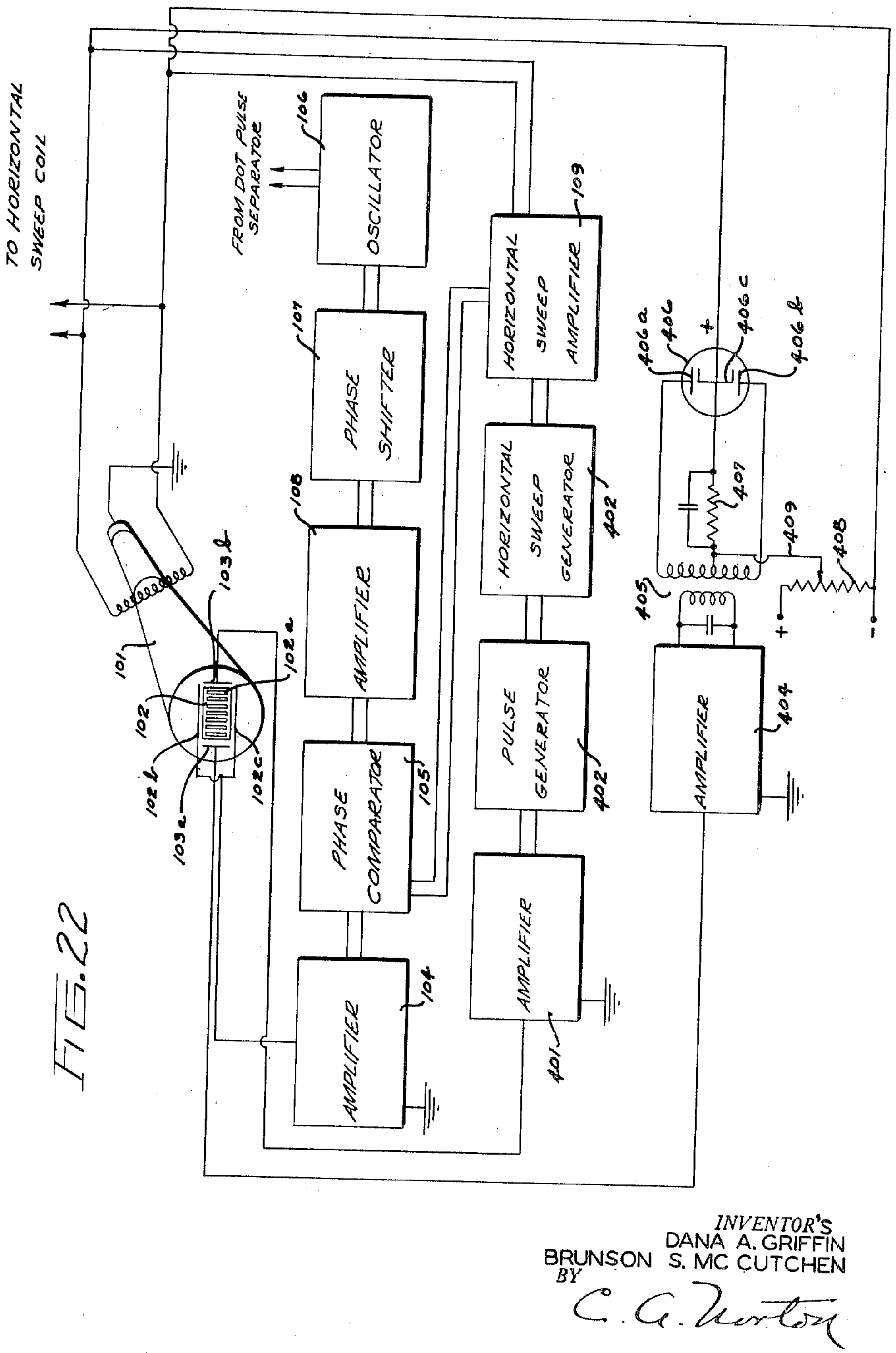
Figure 23:
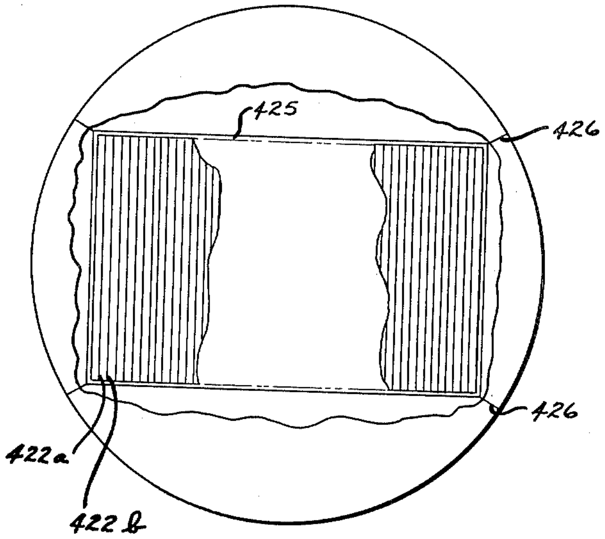
Figure 24:
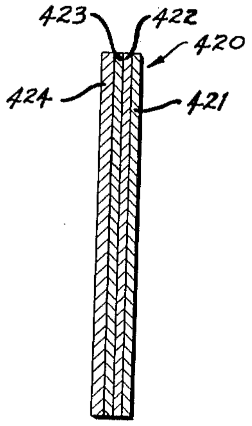

Fig. 19 is a face view of a control cathode ray tube according to our invention;

Fig. 20 is a fragmentary sectional view of the screen and target end of the tube shown in Fig. 19, on lines 20—20 of Fig. 19;

Fig. 21 is a circuit diagram of a receiver such as shown in Fig. 14, with our improved sweep control system applied to control both vertical and horizontal deflection;

Fig. 22 is a schematic diagram of a control circuit in which the speed of sweep is controlled automatically at any point in the line, and the beginning and ending point of each line as well as the position of the raster are also automatically controlled;

Fig. 23 is a view from the gun side of a kinescope provided with a color filter and control lattice such as may be employed when it is desired to obtain the control wave from the kinescope itself without the use of a separate control tube;

Fig. 24 is a vertical section through the screen of Fig. 23, and

Figure 25:
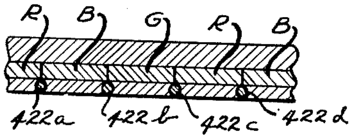

Fig. 25 is a horizontal section through the same.

In this application we have disclosed various forms of color television transmitters and receivers for the purpose of illustrating various uses of our improved scanning control system. Certain features of the transmitters and receivers herein shown and described but not claimed herein, other than the scanning control system, are the sole invention of Dana A. Griffin and are described and claimed in a companion application for Letters Patent executed concurrently herewith.

For the purpose of this application, the following definitions of terms used herein are established; the term "image transducer tube" means a tube which converts light into an electric current or voltage, and vice-versa. It includes the iconoscope, the orthicon and other equivalent tubes converting an image into electric currents or voltages, and also the kinescope, which converts electric currents or voltages into light.

The words "primary colors" are used to mean those light colors which when combined in various proportions will synthesize white light, or practically any desired color. Examples of these are red, blue, and green.

Referring more particularly to the drawing, in Fig. 1 we have shown that part of the transmitter set-up, up to and including the iconoscope and our improved line sweep control system. 10 represents the object, the picture of which is to be transmitted; in this case shown as an apple. The image of the apple is focused by means of a lens system 11, for simplicity illustrated as a single simple lens, upon the stationary color filter 12; in this case a transparent or translucent screen. In one embodiment of the screen, it may consist of a glass plate 13 which may have a ground face, preferably on the side to which the filter material is applied, or may be transparent. The filter layer 14 in one embodiment of the invention is applied to the surface of the glass plate 13 in the form of parallel stripes of transparent color filter material. (Figs. 2 and 3.) In the case of a three color system, the stripes may be successively blue, green, red, repeating in sequence, the first stripe 15 on the left, for example, being blue, the next, 16 green, the next, 17 red, the fourth, 18 blue, the fifth, 19 green, and so on. Blank stripes may be left periodically across the face of the filter, if desired. The width of the stripes in the filter is so chosen that when the image is projected on the mosaic of the iconoscope, the width of each stripe is preferably a little greater than the diameter of the scanning cathode ray spot on the mosaic, and in one embodiment of our invention the filter is arranged so that the line scanning path of the scanning beam is at right angles to the direction of the stripes.

Such color filters are known, and the manner of making the filter is not per se a part of our invention except as described and claimed in this application and the concurrently executed application of Dana A. Griffin. Any suitable process may be employed.

The image produced on the filter 12 is focused by means of lens system 25, diagrammatically illustrated as a simple condensing lens, upon the mosaic plate 27 of the iconoscope tube 26. This iconoscope may be of conventional construction, having an angularly extending tube 28 containing the electron gun 29, and having the usual vertical and horizontal sweep coils **110*a* and 110*b***, and since its construction per se may be in all respects conventional, it is believed that no further description is necessary. The output of the iconoscope may be amplified and used to modulate a transmitter of conventional type.

It will be understand that with the arrangement shown and described, the image of the apple is projected upon the mosaic screen 27, but this image is now no longer in the natural color of the image such as would be seen if a colorless sheet were substituted for the filter 12, but will be made up thin stripes, each stripe of which is in only the color passed by the filter stripe through which the light passed; that is to say, considering three adjacent image stripes on the mosaic plate, the first stripe may be the green light received from the object, the next stripe the red light received from the object, the third stripe the blue light received from the object, and so on, in a repeating pattern.

In monochrome transmission, the picture information for each line is sent continuously, as shown in Fig. 8*a*, representing a portion of the upper carrier envelope for the beginning of a picture line. In this figure, 30 is the upper edge of the line synchronizing pulse, 31 the trailing edge, and the remainder of the figure represents light intensity as the scanning beam moves over the image.

In color transmission, in order to prevent color "smearing" in the received picture, it is desirable to cut off the output of the camera tube by cutting off the video amplifier following the camera tube each time the beam is moving from one picture element to the next, and to turn it on when the beam is completely in the next element, so that the picture information is sent as a series of discrete pulses or bursts of modulated carrier waves producing separate colored dots at the receiver, each dot representing the primary colored light value of the particular picture element being scanned at the moment.

By breaking up the horizontal lines into dots, some horizontal resolution will ordinarily be lost over what would be obtainable if the line were continuous as in monochrome television, but it will be understood some loss can be tolerated. If the horizontal resolution is to be of the same value as the vertical, the number of dots per second transmitted and reproduced will be 11.025 million per second for a picture having a 4:3 aspect ratio and 15,750 lines per second.

For economy of channel width, an acceptable picture can be transmitted and reproduced with 7.6 million dots per second, and for a picture transmitted in a band width no greater than that now allocated for monochrome television 3.8 million dots per second. This latter, however, is considered a degraded form of picture.

Figure 4:
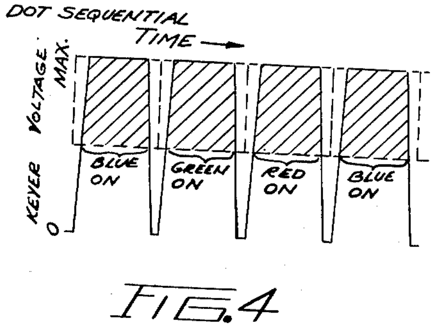
Fig. 4 is a chart of the iconoscope video amplifier on-off bias voltage wave plotted against time, as related to elemental areas of the image to be transmitted when dot sequential transmission is employed.

One way in which the dot type of transmission may be accomplished in a dot sequential system is as follows:

The control grid or grids of the video amplifier following the iconoscope are biased beyond cut-off and modulated by a wave of the pattern shown in full lines in Fig. 4, in which the dotted squares represent successive elemental areas of the image to be scanned. In the dot sequential transmission system, each successive area is scanned without skipping any areas. It is desirable to have a small time interval between successive areas, during which the output of the iconoscope or of the video amplifier following it is zero. This permits some latitude of adjustment and control. At the same time, it is desirable to keep this interval small by providing a rapid rise and fall time of the bias voltage in order to transmit as much light information as possible concerning each elemental area.

Figure 5:
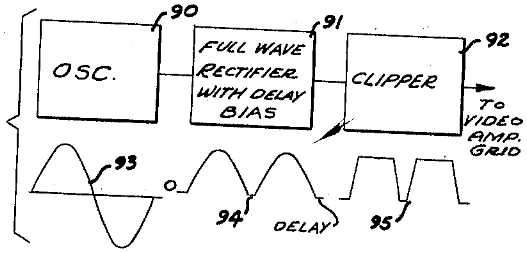
Fig. 5 is a diagrammatic showing of a circuit for producing the voltage wave of Fig. 4.

A circuit for providing a bias voltage, such as shown in Fig. 4, is indicated diagrammatically in Fig. 5, wherein 90 represents an oscillator, the output of which is rectified by full wave rectifier 91 provided with delay bias, and the rectified output is fed through a clipping circuit 92. The oscillator in this instance is tuned to one-half the dot frequency, and gives the sine wave output indicated at 93. After full wave rectification with delayed bias, the output is as indicated at 94, and after clipping, the wave form is as shown at 95. This, of course, may be amplified, if desired, before being applied to the grid or grids of the video amplifier following the iconoscope, and will produce in the video amplifier output a wave of the form shown in Fig. 8b. The magnitude of this bias voltage is such as to maintain the video amplifier either at cut-off, or full on, on the linear portion of its grid voltage-plate current characteristic. The cross-hatched areas of Fig. 4 show the periods of transmission of color information. It will be seen that the picture information from the video amplifier is successive discrete pulses or bursts of color information representing the color intensity of the primary colors employed in the filter, as ror instance, blue, green, red, blue, green, red, and so on, as shown in Figs. 8a and 8b with each pulse or burst separated by a small time of no output. In Fig. 8b, the envelope of the corresponding portion of the carrier wave, 30 is the peak value of the line synchronizing pulse, and 31 its trailing edge, and the curves under the letters B, G, R, etc., represent the light intensity of the respective colors in the corresponding picture element. In considering curve 8b, it should be remembered that this curve is greatly expanded along the horizontal axis for clarity of illustration. The intervals of output from the iconoscope are fractions of a microsecond, and the movement of the beam during the interval of transmission of any one dot may be assumed to be so small that the output of the iconoscope during any particular dot period has a flat top, instead of the varying amplitude shown, although theoretically the curve is correct.

The intervals of no output appear in the carrier wave as signals corresponding to black level or "blacker than black" and occur at dot frequency. They may be employed in the receiver to aid in maintaining precise synchronization between the scanning beams at the transmitter and receiver respectively, to insure that when the beam at the transmitter is on a red (green or blue) section of the image and the transmitter is therefore transmitting red information, the beam at the receiver will likewise be on the correct red (green or blue) section, in a manner to be described.

Figure 6:
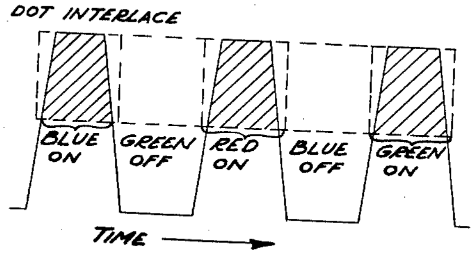
Fig. 6 is a chart similar to Fig. 4 showing the same quantities as in Fig. 4 when dot interlace transmission is employed.

If the transmission is of the dot interlace type, the image is scanned, not by each element in succession, but every other element in succession, and in order to prevent color smearing in this instance, the output of the iconoscope or the video amplifier following it is again cut off except during the time the beam is within an elemental area. This is indicated in Fig. 6 in which the cross-hatched areas indicate the time during which output is being taken from the iconoscope and video amplifier. In this case it is not necessary to employ rectification. The oscillator 90 may be tuned to the same frequency as in dot sequential transmission. The output of the oscillator 90 is then passed directly into the clipping circuit 92 and has the output form shown at 96, which is then applied, after amplification, is desired, as a bias to the grid of the video amplifier, or amplifiers, following the iconoscope. If curves similar to Figs. 8a and 8b are drawn for this dot interlace transmission, the difference between the two sets of curves will be that the time interval between successive iconoscope output pulses, and the corresponding black level transmitter pulses will be considerably longer than in Figs. 8a and 8b, covering more than one-half cycle.

To insure line (horizontal) deflection of the scanning beam of the iconoscope at the proper and uniform speed, the control circuit shown in Fig. 1 may be used. In this embodiment of the invention, we may use a control or monitor cathode ray tube 101, which may be of comparatively small size, having preferably on the inner side of its face a metallic mask 102 having vertical slits 102a, the number of these slits corresponding to the number of dots in each scan of a line. The electron beam in control tube 101 is supplied with a line deflection voltage in synchronism with that applied to the horizontal sweep coil of the iconoscope, so that both beams are deflected in synchronism. In this embodiment of our invention, no vertical deflection is employed in tube 101. If the width of the deflection in control tube 101 is the same as that in the iconoscope, the width of each slit is preferably half the width of a color element. If the former is greater or less, the slits will be greater or less in the same proportion.

The mask 102 is connected to a positive source of voltage so as to act as an anode, and no z-axis modulation is provided on tube 101, for varying light intensity, although it is desirable to provide z-axis modulation to extinguish the beam during line-fly-back. The tube 101 therefore gives a trace of constant intensity during line scan, and each time it passes over the metallic grids of the mask 102, a pulse will be delivered from the connection to mask 102. If the slits have half the width of a color element these pulses will be in the form of a substantially square wave of dot frequency.

To provide against harmful effects of secondary emission from mask 102 when impinged upon by the electron beam, a pair of collector electrodes 102b and 102c may be provided parallel to mask 102 above and below it, insulated therefrom, and spaced equidistant from the horizontal center line of the beam, these collector electrodes being connected together and maintained at a sufficiently high positive potential to prevent the accumulation of secondary electrons in the space in front of mask 101 (see Figs. 19 and 20).

The collector electrodes 102b and 102c may be metallic plates set edgewise on the inner face of the tube as more particularly shown in Fig. 20, or any other suitable form may be employed which does not affect the beam sweep.

Pulses of the same frequency as those given by mask 102 will be produced in the collector electrodes 102b and 102c, due to fluctuation of secondary emission from mask 102 as the beam sweeps over it, and the pulses from either may be used for control purposes in the manner to be described, although it should be noted that the instantaneous sign of the pulses will be opposite on the mask and on the collector electrodes, those from the collector electrodes being negative, and those from the mask positive. These pulses we term control pulses.

The control pulses from the tube 101 may be amplified by amplifier 104 to the extent desired. Preferably, the amplifier 104 will be tuned to the square wave frequency, so as to deliver in its output a sine wave, or approximation thereto, which we term a control wave, and the output of the amplifier is supplied to phase comparator 105. Any suitable phase comparator circuit may be used, such as that shown in patent to Harper, No. 2,066,528.

Figure 7:
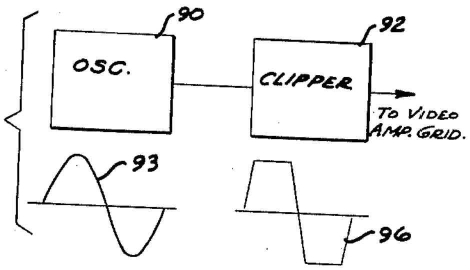
Fig. 7 is a diagrammatic showing of a circuit for producing the voltage wave of Fig. 6.

The phase comparator is supplied also with the amplified output from master oscillator 106, which is set to dot frequency (3.8 mc. in dot interlace, or 7.6 mc. in dot sequential systems in the present embodiment of our invention) through adjustable phase shifter 107, the output of which is amplified by amplifier 108, if desired. Master oscillator numbered 106 in this figure, may and preferably will be the same oscillator indicated by numeral 90 in Figs. 5 and 7, the output of which may be doubled in frequency in a well known manner before being supplied to phase shifter 107.

The output of the phase comparator is a direct current voltage varying in sign depending on whether the control wave lags or leads the voltage of the master oscillator, and in magnitude depending on the amount of lag or lead within 90°, and is applied as a grid bias voltage to the grid or grids of the horizontal deflection amplifier 109 to increase or decrease the instantaneous horizontal deflection voltage, which is applied to the horizontal deflection coil 110 of the iconoscope, and also to the horizontal deflection coil 111 of control tube 101. The vertical deflection coil of the iconoscope may be connected in the usual way. Control tube 101 in this embodiment of our invnetion employs no vertical deflection coil, and its beam is not deflected vertically.

The operation of the control circuit will now be described. The local oscillator 106 delivers a constant frequency output which is the basic control frequency. The slots 102a are so positioned that control of the beam in tube 101 generates pulses approaching square wave form of the same frequency. When these are supplied to amplifier 104, which is preferably tuned to the same frequency, the output of the amplifier becomes more nearly a sine wave. While we prefer to convert the square or pulse waves to a sine wave or approximation thereto, the pulse waves may be fed to the phase comparator as such, if desired. When the deflection occurs at the desired rate, the two voltages supplied to the phase comparator are in phase, as shown in Fig. 1b, condition 1, in which the curve M represents the master oscillation and curve C the control wave generated by control tube 101.

Figure 1B:
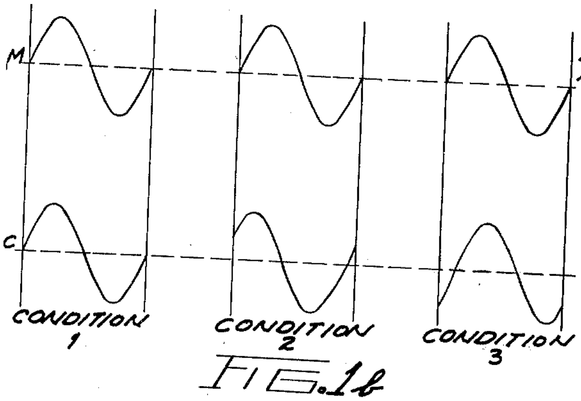

If for any reason the beam travels too fast, usually because the deflecting voltage is too high, the scanning pulses from the control tube will tend to increase in frequency, and this is first evident as a lead in phase of the scanning or control wave over the oscillator wave, this condition being shown in Fig. 1*b*, condition 2. If, on the other hand, the deflection rate of the beam is too slow, the control tube output wave begins to lag the oscillator output, as shown in Fig. 1*b*, condition 3. These two voltages supplied to the phase comparator cause the phase comparator to deliver a direct current voltage which varies in sign according to whether the control wave lags or leads the oscillator wave, and the magnitude of the voltage varies with the amount of lag or lead, becoming a maximum for 90° phase displacement between the two waves, and being zero at phase coincidence.

In accordance with one aspect of our invention, this direct voltage derived from the phase comparator is applied to the horizontal deflection amplifier 109 to control the gain thereof; for example, it may be applied as a grid bias and the polarity is so chosen that when the beam deflection is too slow, the output of the phase comparator has a polarity to increase the gain of the amplifier and deliver a larger deflection voltage, thereby speeding up the beam deflection; similarly, when the beam is being deflected too fast, the voltage sign of the phase comparator output is such as to reduce the gain of the amplifier and slow the beam deflection. The result of this is a very precise control of the deflection rate throughout the entire line deflection, because any incipient frequency change in the control frequency resulting from incorrect deflection speed, automatically produces a correcting voltage for even small phase differences in every cycle.

The precision of control afforded by this arrangement is far greater than that of any other method. Bearing in mind that a displacement of the beam by only the width of one dot, which represents a frequency variation of 1 in 3.8, 7.6 or 11.025 megacycles will destroy color rendition, it is immediately apparent that no method of frequency discrimination or detection is capable of distinguishing between small sweep speed changes, which are nevertheless sufficient to destroy color rendition.

While we prefer to use the circuit just described, there are other ways of obtaining the control pulse wave from control tube 101. For example, instead of taking these pulses from electrodes 102, or 102*b* and 102*c*, we may provide a photo-electric cell 201 exposed to the light from control tube 102, and feeding amplifier 104, as shown in Fig. 1*a*. As the electron beam scans the mask 102, the light falling on photo-cell 201 is chopped at the same frequency as before, and the photo cell delivers a pulse or square wave to amplifier 104. In this instance the mask 102 may be an opaque coating, and need not be conducting.

While we prefer to supply the phase comparator with a control wave and oscillations of sine wave form, or approximations thereto, either or both waves may be in the form of pulses if desired.

Referring now more particularly to Fig. 9, this differs from the arrangement shown in Fig. 1 in the use of a mirror filter instead of a transparent or translucent filter. The image of the object 10 is focused upon the mirror filter 35 by the lens system 11, and reflected from the mirror toward the iconoscope 26 and focused upon the mosaic screen by the lens system 25. For simplicity of illustration, we have shown the mirror 35 slightly inclined with respect to the axial light rays from the lens 11.

The mirror filter in this instance (Figs. 10 and 11) may be made of glass 36, coated with a mirror layer of silver or aluminum 37 and with the filter layer 38. The filter layer is similar to that described with reference to filter 12 and consists of vertical stripes 40, 41, 42, 43, 44 and so on, in the repeating pattern of blue, green, red, blue, and so on, and may be made in a suitable manner known in the art, such as by the processes already mentioned with respect to filter 12. In so far as the transmission is concerned, it is the same as described with respect to Fig. 1.

Another method of making the filter mirror is to use colored metal wires, which are mounted side by side on a backing plate in the repeating pattern desired, and then ground and polished to form a mirror surface. A magnified cross section of such a filter mirror is shown in Fig. 12, in which 202 is the backing plate, 202*a* and 205 red metal wires, 203 and 206 blue metal wires, and 204 and 207 green metal wires, all secured on plate 202 by suitable binder 208.

Fig. 9 shows only the differences in the optical arrangement between Figs. 1 and 9, it being understood that the same scanning control circuit shown in Fig. 1 may be employed with the arrangement of Fig. 9.

Referring now to Fig. 14, we have shown a receiver, in accordance with our invention, producing a color image from signals, such as indicated in Fig. 8*b*.

50 indicates a conventional monochrome television receiver, such as is ordinarily employed to receive black and white pictures, and having a suitable antenna 51. The picture voltage from the output of the receiver 50 is impressed between the cathode and control grid, diagrammatically indicated at 53, of the projection kinescope 52, provided with vertical and horizontal deflection coils 56 and 57 supplied from the output of the vertical and horizontal sweep generators, amplifiers and controls, indicated diagrammatically at 55, and which are usually a part of the television receiver 50. The light from the kinescope 52 passes through lens system 58, herein shown for purposes of simplicity as a condensing lens, and is focused upon the screen 60. The screen 60 may be of glass 61 having its inner face ground, and having the filter surface 62 applied thereto. The filter 62 is similar to the filter 12, consisting of vertical stripes in the repeating pattern blue, green, red, blue, green, red, and of approximately the width of the focused spot of the scanning beam, and the picture may be observed by viewing the filter surface 62 usually, although not necessarily, from the side facing lens 58.

In order to maintain the image in its proper colors, it is necessary that exact line synchronism be maintained between transmitter and receiver, so that as the transmitting scanning beam rests upon a red portion of the image, the light spot at the receiver must be upon the corresponding red portion of the filter. Should the two beams get out of step to the extent that, for example, the transmitter beam is on a green portion of the image while the receiver beam is on the red portion of the filter, color rendition will be destroyed.

To adjust the raster to the proper position with respect to the color filter or the color phosphor pattern at the receiver, two adjustments will usually be provided. The first of these is a means for shifting the raster horizontally, without changing the sweep width. In a simple form this may be a manually adjustable potentiometer connected across a fixed source of direct voltage and feeding the horizontal deflection yoke or plates and effective, on adjustment, to shift the entire raster horizontally by an amount up to three or more elemental picture areas.

When the color pattern is in vertical stripes, no vertical adjustment is necessary. If the filter pattern is not one having vertical stripes, then a vertical centering adjustment is also necessary, this being similar to the horizontal centering adjustment, but feeding the vertical deflection yoke or plates.

A sweep width control is also provided which changes the amplitude of the horizontal deflection without changing the centering, by increasing or decreasing the magnitude of the horizontal deflecting voltage. The frame of the picture is marked on the screen by appropriate lines.

If the picture is off center and/or overlaps or fails to fill the frame lines, color rendition will be false. To correct it, the centering and frame width adjustment must be made. When the required adjustment is completed, the picture will exactly fit the frame, and the color rendition will be correct, assuming that the receiver sweep is synchronized with the transmitter sweep.

When the color pattern is other than vertical stripes, vertical centering and sweep amplitude must also be adjusted to center the picture vertically and make it fit the frame vertically.

Because any undesired variation in the amplitude of the horizontal sweep voltage, in the case of the vertical striped color pattern, and of either the horizontal or vertical striped color pattern, and of either the horizontal or vertical sweep voltages, in the case of other patterns, will adversely affect color registry, it is desirable to regulate the power supply in the transmitter as well as in the receiver very closely. Circuits for this purpose are well known in the art.

In addition to the foregoing, it will usually be desirable to provide a further means for assuring exact synchronism and proper color registry between the transmitter and receiver scanning beams. This may be similar to the control circuit shown and described with reference to Fig. 1.

In this instance we may use control tube 120 provided with slotted electrode 122 having vertical slits 122a the width of which is in the same ratio to one half the width of the individual color elements in the kinescope filter and equal in number thereto, as the ratio of the line deflection in the control tube to the line deflection in the kinescope, collector electrodes 122b and 122c and having a horizontal deflection coil 121 connected supplied with a deflection voltage synchronized with the deflecting voltage of the horizontal deflecting coil 57 of the kinescope 52.

The pulses generated on slotted electrode 122 or on collector electrodes 122b and 122c or in the photo-cell exposed to the face of control tube 120, if employed, as in the alternative form shown in Fig. 1a, by the sweep of the beam over the face of mask 122 are amplified, if desired, in amplifier 124 tuned to the square wave frequency and the output applied to phase comparator 125, similar to phase comparator 105.

The incoming black level or "blacker than black" pulses transmitted between dots are separated in dot pulse separator 126, which may be similar to the well known circuits for separating the line synchronizing pulses, and applied to oscillator 127 tuned to the dot pulse frequency for the purpose of holding it in step with received dot separation pulses, the frequency of which is fixed at the transmitter, as already described. The output of oscillator 127 may be passed through phase shifter 128, then through amplifier 129, if desired, and applied to the phase comparator 125, the output of which is applied as a correction to the horizontal scanning deflection amplifier, preferably as a grid bias control to vary the amplification and thus vary the deflection voltage.

The phase shifter permits latitude of initial adjustment, but will ordinarily not be changed after the correct adjustment has been obtained. The synchronism control afforded by this circuit is extremely effective, because the receiver beam is held to its proper position by the dot separation pulses between each dot. Should the beam, for any reason tend to sweep too fast, the control wave delivered by the tube 120 begins to go out of phase with the output of oscillator 127 by only a small part of a cycle, a correcting voltage is delivered to the deflection amplifier in a sense to reduce the deflection voltage and slow the beam travel. Conversely, should the beam start to lag, the phase comparator delivers a correcting voltage which increases the amplification of the deflection amplifier and speeds the beam up.

One additional point needs to be considered. One of the problems encountered in the production of the color stripe filters and mask or other forms of filters for use with our system is to determine the proper width and position of the vertical stripes or other color elements over the raster. Correct size and position are necessary in order to obtain correct color rendition.

Because both the dot sequential and dot interlace systems involve the scanning of a large number of small color elements which vary in color as the electron beam sweeps each line of the raster, a degree of precision is required which is not necessary in monochrome equipment.

Variations from precise linearity of beam sweep may be caused by the sweep oscillator and associated circuits, the construction and mounting of the horizontal deflection yoke, and the design and operation of the kinescope or kinescopes employed in the equipment, even in the same models. These variations may make it desirable to have a filter and mask specially designed for each combination of sweep oscillator, yoke, and tube that are used together to produce a color picture, and even for each individual receiver, in receivers of the same model.

In the case of direct view tubes with internal color phosphors, a prototype with a white phosphor is preferably used, under the same conditions that the color tube will be used; i. e., with the same sweep oscillator, yoke, and internal tube electrode construction.

To produce the screen filter pattern to be employed in all receivers of the same model, or in different individual receivers, the receiver to be tested is connected to a monoscope or tuned in to a station which is transmitting the proper number of picture lines and fields. By blanking out all of the stripes of two of the colors, the stripes of the other color will show on the tube raster as white stripes. These can then be photographed on a color film through a color filter of the desired color. By successively causing the lines of each color to appear in the raster, and making three exposures on the same film, each exposure through a color filter of the desired color, i. e., red, blue and green, a composite negative or positive color film can be made which will contain the three sets of color stripes with the proper relationship as to stripe size and color.

An alternate method is to use a square wave generator delivering a square wave of dot frequency connected to supply its output to the video amplifier of the receiver. The square wave amplitude is adjusted so that every other dot on the beam trace is white, the alternate dots being cut off. This will produce on the face of the direct view tube, or on the screen of a projection tube, alternate vertical white and black stripes.

The position of the raster is then carefully marked on the tube face or projection screen, with respect to its horizontal position, and is then photographed. This photograph may then be projected on a large white surface and the position of the stripes drawn, and the stripes may then be filled in with the desired colors. The color drawing thus made may be photographed on color film and the positive of this is made the size desired and may be used as the filter pattern for sets having a given tube yoke and source of sweep voltage, or a filter can be individually made for each receiver by this method. In case the raster of any particular tube is not geometrically perfect, the color elements in a filter so made will be distorted in a slightly non-uniform manner, so that the filter fits the distorted raster.

The mask for control tubes 120 may be prepared in the same way and at the same time the filter pattern is prepared, but in this case the tube 120 or a prototype will be operated without a mask and the square wave applied to the grid as z-axis modulation, the horizontal position of the trace carefully marked, and the screen photographed. From this photograph an opaque or metallic mask with the slits properly located and of the proper width may be prepared.

Any small irregularities in the pattern caused by small individual variations in the receiver circuit, picture tube, and deflecting coils are thus incorporated in the filter for use with the particular model of receiver, or even for the individual receiver. Thus, the filter pattern is purposely made non-uniform and so to speak, tailored to fit the non-uniformities introduced by individual models or receivers, rather than rigorously uniform.

It may be noted that small and non-uniform irregularities will not distort the received picture enough to be noticeable or disturbing, providing proper color rendition is obtained, whereas such irregularities can produce annoying incorrect color rendition and registry with a uniformly patterned filter, that is, one made geometrically perfect, with all stripes truly parallel, of the same width, and of uniform width throughout.

The use of the square wave modulation determines the full width of each color element in the filter or phosphor pattern with great precision. Because the color sampling wave form used in the camera to dissect color pictures is a sine wave or a clipped sine wave, it does not sample any color element for the full time the electron beam is scanning any one color element. This permits tolerance in the amount of error or horizontal "jitter" that may occur before producing color smearing due to improper alignment of the color stripes with the scanning beam.

It may be noted that while loss of horizontal synchrony or horizontal shifting of the picture will destroy the color rendition, this is not true of vertical shifts of the received picture, when the stripes of the filters in both transmitter and receiver run vertically, because vertical shift of the receiver beam will not take it off the proper section of the filter. The vertical stripe pattern is advantageous in that "jitter" in the received picture is ordinarily much greater in a vertical direction than in the horizontal.

Referring now to Fig. 13, we have shown a modified color pattern which may be employed in the filter. In this figure, showing part of the filter enlarged for clarity, successive elementary areas of each line are colored in a repeating pattern red, blue, green, red, blue, green and so on, and the pattern in successive lines is shifted one elementary area, so that the second line is blue, green, red, blue, green, red and so on, the third line again shifted one elementary area to green, red, blue, green, red, blue, and so on.

Instead of being vertical stripes, it will be observed that the color pattern is now repeated vertically as well as horizontally, the first line vertically downward being red, blue, green, red and so on, the second line being the same but displaced one color element, blue, green, red, blue and so on.

It will also be noticed that on a diagonal forty-five degrees downward and to the right, the color pattern repeats, red, green, blue, and so on, whereas on a diagonal forty-five degrees upward to the right the pattern is parallel diagonal stripes. This arrangement has the advantage that better intermixing and blending of colors is produced, but requires absolute registry and sweep control in a vertical as well as a horizontal direction.

Referring now more particularly to Fig. 16, I have shown the application of our invention to a direct viewing receiver. In this case, as before, we may employ a conventional black and white television receiver 50 having antenna 51, the output of which is applied between cathode and control grid 71 of direct viewing tube 70. As before, vertical and horizontal deflection coils 56 and 57 are provided fed by the output of vertical and horizontal sweep generators, amplifiers, and controls 55, usually a part of the receiver 50.

The horizontal deflection control by means of tube 120 and associated circuits shown and described with reference to Fig. 14 will preferably be used with the receiver shown in Fig. 16, but for simplicity of drawing and description, this control circuit is indicated in Fig. 16 only by block 140. In this instance, in one modification, such as shown in Figs. 10 and 11, the filter wil be disposed on the inner surface of the viewing face of the tube 75 as filter layer 76, and a layer of white light phosphor 77 deposited over the filter 76. The filter itself will preferably consist of vertical stripes following the repeating pattern green, red and blue, as indicated by stripes 80, 81, 72, 73 and 84. After the filter pattern is photographed, as already described, the filter may be made by any suitable process, and preferably will be applied to the inner surface of the tube face 75 before it is sealed to the conical portion of the tube envelope.

The filter may be applied to the outer surface of the tube rather than to the inner surface, although in general it is desirable to have the filter and the phosphor as close together as possible in order to avoid parallax.

An alternative to the construction shown in Figs. 10 and 11 is to omit the filter 76 entirely and to use in its place different colored phosphors, for example, to apply red, green and blue phosphors in the repeating stripe pattern, indicated by 80, 81, 82, and so on, to the interior of the tube.

One manner in which this may be done is to coat the interior of the tube face 75 with a protective coating such as wax or lacquer, which is then etched or scored in the lines or areas to receive the phosphor of one color. The selected phosphor, for instance, blue phosphor, may then be applied as in conventional practice; and the protective coating, together with the phosphor deposited thereon may then be removed. After this step is complete, the inner face may have another protective coating applied to it, and may be scored or etched for the stripes or areas of the second phosphor, for example, the green, which is then applied in the usual manner, and will be deposited on the glass in the unprotected stripes or areas. The protective coating, with the green phosphor thereon, may then be removed. After this operation is complete, a third protective coating may be applied and etched or scored in the lines or areas to receive the third phosphor, in this case, the red. The red phosphor may then be applied in the usual manner and the protective coating with the red phosphor thereon removed.

The principles of control described herein may equally well be applied to the control of vertical deflection as well as horizontal deflection and in Fig. 21 we have shown a circuit diagram indicating how both vertical and horizontal deflection control may be applied to a receiver such as shown in Fig. 14. In Fig. 21, like reference numerals represent the same elements as in Fig. 14. The conventional monochrome television receiver is indicated at 50, deriving signals from antenna 51. The vertical sweep generator and amplifier is diagrammatically indicated at 151. The line synchronizing pulses derived from the incoming signal may be separated and a portion of the voltage thereof applied from the vertical sweep generator and amplifier 151 and the line synchronizing pulse separator 152 to oscillator 153, this oscillator operating at the line frequency, at present 15,750. The incoming sync pulses serve to lock the line oscillator to the line synchronizing pulse frequency. The output of the oscillator 153 is supplied to phase shifter 154, and the output thereof is supplied to amplifier 155, the output of which is fed to the phase comparator 159. The vertical control tube is indicated at 156, having a mask 157 with slots 157*a*. In this instance the mask is indicated as extending vertically in the tube so as to readily distinguish it from the mask 122 in tube 120 controlling the horizontal deflection.

The slots 157*a* are preferably made half the width of the line elements of the picture (if tubes 52 and 156 are the same size) and correspond in number and position to the lines of the picture. The vertical deflection coil 161 is operated in synchronism with the vertical deflection coil 57 of the kinescope 52. Collector electrodes 157*b* and 157*c* are provided, as before, and the line frequency pulses derived from mask 157 or collector electrodes 157*b* and 157*c* are supplied to amplifier 158 which may be tuned to line frequency, the output of which is fed to the phase comparator 159 and compared with the output of amplifier 155.

The output of the phase comparator, as before, will be a direct current voltage, the sign of which depends on whether the pulses from the control tube 156 lag or lead the incoming line synchronizing pulses, and the magnitude of which is proportional to the amount of lag or lead. In a manner similar to the horizontal control, the output of the phase comparator 159 is applied as a grid bias to the vertical sweep amplifier 151, and serves to increase or decrease the amount of amplification, so as to speed up the deflection when it is too slow and to slow it down when it is too fast.

The horizontal control tube 120, and its associated circuits are the same as already described with respect to Fig. 14, and the description is not believed necessary to be repeated here. The photo-cell production of the scanning pulse wave shown in Fig. 1*a* may be used in this embodiment of our invention, if desired.

Ordinarily, using a color filter in which the stripes run vertically, the vertical control will not be necessary, because displacement of the beam in a vertical direction will not cause failure of color registration or introduce color distortion. However, if the stripes do not run in a vertical direction, or if a filter of the type shown in Fig. 13 is employed, the vertical control of Fig. 19 will be desirable.

It will be understood that the deflection controls herein explained may be applied to monochrome receivers for the purpose of obtaining a more stable picture, and it will be clear that said principles of control may be applied in circuits other than television, wherever precise control of beam deflection is desired.

In addition to controlling the sweep speed at all points in the beam travel, it may also be desirable to control the position of the raster as a whole by automatic means and to control initiation of the fly-back at the proper point at the ilne end. In my sole application, referred to in the foregoing, I have disclosed ways of achieving this control by the use of photo-electric cells. According to the present invention, this control may also be achieved without photo-electric cells, by the use of supplementary collector electrodes within the control tube. One way in which this may be done is diagrammatically illustrated in Fig. 22 in which like reference numerals represent like parts as in the other figures. In addition to the mask 102 with the line slits 102*a* and the collector electrodes 102*b* and 102*c*, we may now provide a starting position control electrode 103*a*, and a line end position control electrode 103*b*, these being in the form of narrow plates or other conductors of approximately one line width mounted within the tube at the desired left and right hand edges of the raster and insulated from the mask 102 but likewise connected to a positive source of potential so as to receive a pulse when the beam impinges on them. The sweep speed control is, as before, and the description need not be repeated here. To provide for automatic initiation of fly-back when the beam reaches the end of the line, the line end electrode 103*b* may be connected to amplifier 401 which may be tuned to line frequency. The pulse delivered by the electrode 103*d*, when the beam impinges upon it at the end of the line after amplification to the extent desired is applied to "a one shot" multivibrator or similar pulse producing device 402. Such circuits are well known and are per se not part of our invention, and are not described in detail. The output of the pulse generator 402 is applied to the horizontal sweep oscillator 403 as a pulse of the proper polarity to cause the resistor condenser network in the sweep generator to discharge the condenser. The fly-back sweep then occurs, and the oscillator is made ready for the next scan sweep which is controlled by the line synchronizing pulse.

By properly positioning the electrode 103*b*, the fly-back may be triggered off at the desired point at the line end and the principles herein disclosed may be applied either in the transmitter or the receiver and may be applied either to horizontal or vertical sweep control.

To control the position of the raster as a whole, the pulse from the line starting electrode 103*a* may be impressed upon the amplifier 404. These pulses occur at line frequency and the amplifier may be tuned to such frequency and its output passed through transformer 405 to full wave rectifier 406, which may be a double diode having a pair of anodes 406*a* and 406*b*, and a cathode 406*c*. The rectified voltage in this case appears across resistor 407 shunted by by-pass condenser and connected between the cathode 406*c* and the midpoint of the secondary of transformer 405. The midpoint of the secondary may be connected to the variable tap 409 on resistance 408 connected between the positive and negative terminals of the D. C. power supply and the cathode 406*c*, and the negative terminal of resistance 408 may be connected to the horizontal sweep coil of the control tube and of the iconoscope of kinescope. The polarities through the system are so chosen that the output voltage from the rectifier 406 is applied as an inverse feed back in the horizontal positioning circuit. The amount of control is dependent on the gain of the amplifier and variations in the pulse current from electrode 103*c*.

The width of electrode 103*a* may be greater or less than the width of one color element but in any event will be only a very small part of the line, and the adjustment is preferably made such that the raster tends to shift to the left in Fig. 22 and in so doing develops a voltage on electrode 103*a* which, after rectification, causes a shift of the raster to the right, and preferably equilibrium is obtained when the left hand edge of the raster coincides with electrode 103*a*.

It may not always be desirable or necessary to use all three controls, i. e., the automatic sweep speed control, automatic fly-back control, and automatic raster positioning control. Any one or two may be used together either in the transmitter or the receiver, or all three may be used together in both.

While we have so far shown and described the scanning control wave which is compared in phase with the desired frequency oscillations as being derived from a separate control tube on which no picture modulation is applied, and while this arrangement has certain advantages, it is not necessary to provide a separate control tube. The control wave may be generated in the iconoscope or kinescope by the provision therein of a conducting slotted mask, or grid or lattice having wires disposed therein across the entire raster of the beam, the number and spacing of said slots or wires corresponding to the number of dots per line.

As the beam sweeps across the mask or grid, a control wave of the desired frequency is generated, which may be amplified and supplied to the phase comparator as before.

With such an arrangement, if the transmission is according to the present American technique in which increase of carrier wave amplitude produces a decrease of light in the kinescope, the dot separation pulses will preferably be made "blacker than black" rather than at black level, so as to maintain control of the deflection speed of the beam in black levels of the picture. Otherwise, the dot separation pulses would disappear in black areas of the picture, and control would be lost.

With this modification, the z-axis modulation of the beam of the kinescope should be so controlled that the beam is not entirely extinguished at black levels or during dot separation pulses, but is merely reduced to such an intensity as not to produce light when it strikes the screen, but still produces a pulse each time it impinges on the mask or grid wire.

This system may be advantageously employed with the British type of transmission, which is the inverse of the American-type. In the British system, an increase in the strength of the carrier increases, rather than decreases, the light produced on the screen, and in this type of transmission, the dot separation pulses will preferably be in the "whiter than white" amplitude range; that is, will have an amplitude greater than that to produce white. To prevent diluting the picture with white under such conditions, the mask or grid should be positioned so as to intercept the beam during the "whiter than white" dot separation pulses.

Referring now more particularly to Fig. 23, in case it is desired to avoid the use of a separate control tube and to obtain the control wave from the kinescope itself, a screen 420 may be provided which consists of a glass plate 424 forming the support for the screen, the color filter 423, the wires or conductors of the grid or lattice 422*a*, *b*, *c*, and so on, and the phosphor 421, the screen being inserted in the tube and held in place by supports 426, which may be metal, and one of which may extend through the envelope of the tube to act as a conductor from the grid. A metal rim 425 is provided for making contact to all the grid wires or strips. The grid wires in this instance may lie along the boundary of the various color elements as more clearly shown in Fig. 25, and the phosphor is deposited in between the conductors 422*a*, *b*, *c*, *d*, and so on, or it may even be deposited on top of them. The arrangement of these three figures is that which may be employed when the screen employs a color filter and white phosphors. If color phosphors are employed, as already described, the filter elements will be omitted and the conductors 422*a*, *b*, *c*, *d*, and so on, mounted immediately against the glass plate 423, and the phosphors applied on the gun side of the assembly.

By providing the filter lattice and grid as a single unit, which may be mounted in the tube before the flare portion and the face portion are sealed together, difficulties of aligning the lattice and the filter correctly, which would be encountered if these elements were mounted separately within the tube, are greatly reduced.

In the specification, we have explained the principles of our invention and the best mode in which we have contemplated applying those principles, so as to distinguish our invention from other inventions; and we have particularly pointed out and distinctly claimed the part, improvement or combination which we claim as our invention or discovery.

While we have shown and described certain preferred embodiments of our invention, it will be understood that modifications and changes may be made without departing from the spirit and scope thereof, as will be clear to those skilled in the art.

We claim:

1. In an electronic control system, a vacuum tube having means for producing therein an electron beam, means for deflecting said beam periodically, said means including a deflection circuit delivering a periodically varying deflection voltage, a control tube, means for producing therein a control electron beam, means for deflecting said control beam in synchronism with the first said beam, means for producing from said control beam a control wave having a multiplicity of periodic peaks for each excursion cycle of said beam, a local source of oscillations of the frequency of said control wave, and means for controlling the amplitude of said deflecting voltage in accordance with the phase difference between said control wave and said oscillations to maintain the desired instantaneous scanning position of said beams.

2. In an electronic control system, a vacuum tube having means for producing an electron beam, means for deflecting said beam periodically, said means including a deflection circuit delivering a periodically varying deflection voltage, a control tube, means for producing a control electron beam therein, means for deflecting said control beam in synchronism with the first said beam, means for producing from said control beam a control wave having a multiplicity of periodic peaks for each excursion cycle of said beam, a local source of oscillations of the frequency of said control wave, a phase comparator, means for actuating said phase comparator by said control wave and said oscillations, and means for controlling the amplitude of said deflection voltage in accordance with the output of said comparator.

3. In an electronic control system, a vacuum tube having means for producing therein an electron beam, means for deflecting said beam, said means including a deflection circuit delivering a periodically varying deflection voltage, a control tube, means for producing a control electron beam therein, means for deflecting said control beam in synchronism with the first said beam, means for producing a control wave having a series of periodic peaks responsive to impingement of said beam on a series of predetermined points across the deflection path thereof, an oscillation generator generating oscillations of control wave frequency, a phase comparator, means for actuating said phase comparator by said control wave and said oscillations, and means for controlling the amplitude of said deflection voltage in accordance with the output of said phase comparator.

4. In an electronic control system, a vacuum tube having means for producing therein an electron beam, means for deflecting said beam, said means including a deflection circuit embodying a vacuum tube amplifier, having a control electrode, and delivering a periodically varying deflection voltage, a control tube, means for producing a control electron beam, therein, means for deflecting said control beam in synchronism with the peaks responsive to the successive passage of said control beam across predetermined points in the deflection path thereof, a local source of oscillations of the frequency of said control wave, a phase comparator, means for actuating said phase comparator by said control wave and said oscillations, and means for controlling the gain of said amplifier by the output of said comparator.

5. In an electronic control system, a vacuum tube having means for producing therein an electron beam, means for deflecting said beam periodically, said means including a deflection circuit delivering a periodically varying deflection voltage, a control tube, means for producing therein a control electron beam, means for deflecting said control beam in synchronism with the first said beam, means for producing from said control beam a control wave having a multiplicity of periodic peaks for each excursion cycle of said beam, said last mentioned means including a target electrode in said control tube having a plurality of openings therein in a predetermined pattern, means for producing oscillations of the frequency of said control wave, and means for controlling the amplitude of said deflection voltage in accordance with the phase difference between said control wave and said oscillations to maintain the desired instantaneous scanning position of said beams.

6. In an electronic control system, a vacuum tube having means for producing therein an electron beam, means for deflecting said beam periodically, said means including a deflection circuit delivering a periodically varying deflection voltage, a control tube, means for producing therein a control electron beam, means for deflecting said control beam in synchronism with the first said beam, means for producing from said control beam a control wave having a multiplicity of periodic peaks for each excursion cycle of said beam, said last mentioned means including a target electrode in said control tube having a plurality of openings therein in a predetermined pattern, means for producing oscillations of the frequency of said control wave, a phase comparator supplied with said control wave and said oscillations, and means for controlling the amplitude of said deflecting voltage in accordance with the output of said phase comparator.

7. In an electronic control system, a vacuum tube having means for producing therein an electron beam, means for deflecting said beam, said means including a deflection circuit delivering a varying deflection voltage, a control tube, means for producing a control electron beam therein, means for deflecting said control beam in synchronism with the first said beam, means for producing a control wave having a series of periodic peaks responsive to impingement of said beam on a series of predetermined points across the deflection path thereof, said last mentioned means including a target electrode within said control tube having a multiplicity of openings therein in a predetermined pattern, means for producing oscillations of control wave frequency, a phase comparator, means for actuating said phase comparator by said control wave and said oscillations, and means for controlling the amplitude of said deflection voltage in accordance with the output of said phase comparator.

8. In an electronic control system, a vacuum tube having means for producing therein an electron beam, means for deflecting said beam periodically, said means including a deflection circuit having an amplifier delivering a periodically varying deflection voltage, a control tube, means for producing therein a control electron beam, means for deflecting said control beam in synchronism with the first said beam, means for producing from said control beam a control wave having a multiplicity of periodic peaks for each excursion cycle of said beam, said last mentioned means including a target electrode within said control tube having a multiplicity of openings arranged in a predetermined pattern, means for producing oscillations of the frequency of said control wave, a phase comparator, means for supplying said phase comparator with said control wave and said oscillations, and means for controlling the gain of said amplifier in accordance with the output of said phase comparator.

9. The method of controlling the deflection of an electron beam which comprises generating a periodically varying deflecting voltage, deflecting said beam by said voltage, producing a control electron beam, deflecting said control beam in synchronism with the first beam, producing a control wave having a multiplicity of periodic peaks for each excursion cycle of said control beam, producing oscillations of the frequency of the control wave, and controlling the magnitude of said deflection voltage in accordance with the phase difference between said control wave and said oscillations.

10. The method of controlling the deflection of an electron beam which comprises generating a periodically varying deflecting voltage, deflecting said beam by said voltage, producing a control electron beam, deflecting said control beam in synchronism with the first beam, producing a control wave having a multiplicity of periodic peaks for each excursion cycle of said control beam, producing oscillations of the frequency of said control wave, deriving from said control wave and said oscillations a control voltage proportional to the phase difference between said control wave and said oscillations, and controlling the magnitude of said deflection voltage in accordance with said control voltage.

11. The method of controlling the deflection of an electron beam which comprises generating a periodically varying deflecting voltage, deflecting said beam by said voltage, producing a control electron beam, deflecting said control beam in synchronism with the first beam, producing a control wave having a multiplicity of periodic peaks for each excursion cycle of said control beam, said peaks being respectively responsive to passage of said beam across predetermined points in the deflection path thereof, producing oscillations of the frequency of said control wave, deriving from said wave and said oscillations a control voltage proportional to the phase difference between said wave and said oscillations, and dependent in sign on the relative lag and lead thereof, and controlling the magnitude of said deflection voltage in accordance with said control voltage.

12. The method of controlling the deflection of an electron beam which comprises generating a deflecting voltage, amplifying said voltage, deflecting said beam by said voltage, producing a control electron beam, deflecting said control beam in synchronism with the first beam, producing a control wave having peaks responsive to the passage of said control beam across predetermined points in the deflection path thereof, producing oscillations of the frequency of said control wave, deriving from said wave and said oscillations a control voltage proportional to the phase difference between said control wave and said oscillations, and varying the amplification of said deflecting voltage in accordance with said control voltage.

13. In a television system in which elemental areas of the picture are transmitted as light intensity signals interspersed with pulses of greater amplitude than any light signal, an image transducer tube having means for producing an electron beam, and means for deflecting said beam, said means including a deflection circuit embodying a vacuum tube amplifier having a control grid and producing a deflecting voltage, a cathode ray tube, means for producing therein a control electron beam, means for deflecting said beam in synchronism with the beam of said image transducer tube, means for deriving from said control tube a control wave having a series of peaks responsive to the passage of said beam over successive predetermined positions in each deflection cycle, means for producing oscillations of the frequency of said wave, a phase comparator, means for actuating said phase comparator by said wave and by said oscillations, and means for controlling the gain of said amplifier by the output of said phase comparator.

14. In a television system, in combination, an image transducer tube having means for producing an electron beam, means for deflecting said beam periodically, said means including a deflection circuit delivering a periodically varying deflection voltage, a control tube, means for producing therein a control electron beam, means for deflecting said control beam in synchronism with the first said beam, means for producing a varying control wave responsive to the passage of said control beam over predetermined points in its deflection cycle, a source of oscillations the frequency of which is substantially the same as that of said responsive wave, means for comparing the phase of said oscillations and of said responsive wave and for deriving therefrom a correcting voltage for increasing and decreasing said deflecting voltage, and means for utilizing said correcting voltage to increase or decrease said deflecting voltage.

15. In a color television system in which elemental areas of each line of the picture are transmitted as primary color light intensity signals separated by pulses of greater amplitude than any light signal, in combination, an image transducer tube having means for producing therein an electron beam, means for deflecting said beam, said means including a deflection circuit producing a deflection voltage, a cathode ray control tube, means for producing therein a control electron beam, means for deflecting said beam in synchronism with the first said beam, means for producing from said control tube a control wave responsive to the passage of said control beam over successive predetermined positions in each deflection cycle, a local source of oscillations of the frequency of said control wave, means for comparing the phase of said wave and of said oscillations, and means for controlling said deflection voltage in accordance with the phase difference between said control wave and said oscillations.

16. In a color television system in which elemental areas of each line of the picture are transmitted as primary color light intensity signals separated by pulses of greater amplitude than any light signal, in combination, an image transducer tube having means for producing therein an electron beam, means for deflecting said beam, said means including a deflection circuit producing a deflection voltage, a cathode ray control tube, means for producing therein a control electron beam, means for deflecting said beam in synchronism with the first said beam, means for producing from said control tube a control wave having peaks responsive to the passage of said control beam over successive predetermined positions in each deflection cycle, a local source of oscillations of the frequency of said control wave, a phase comparator, means for energizing said phase comparator with said control wave and said oscillations, and means for controlling said deflection voltage in accordance with the phase difference between said control wave and said oscillations.

17. In a color television system in which elemental areas of each line of the picture are transmitted as primary color light intensity signals separated by pulses of greater amplitude than any light signal, in combination, an image transducer tube having means for producing therein an electron beam, means for deflecting said beam, said means including an amplifier delivering a deflection voltage, a cathode ray control tube, means for producing therein a control electron beam, means for deflecting said beam in synchronism with the first said beam, means for producing from said control tube a control wave having peaks responsive to the passage of said control beam over successive predetermined positions in each deflection cycle, a local source of oscillations of the frequency of said control wave, a phase comparator, means for supplying said phase comparator with said control wave and said oscillations, and means for controlling the gain of said amplifier in accordance with the output of said phase comparator.

18. In a color television system in which elemental areas of each line of the picture are transmitted as primary color light intensity signals separated by pulses of greater amplitude than any light signal, in combination, a kinescope having means for producing therein an electron beam, means for deflecting said beam, said means including a deflection circuit producing a deflection voltage, means associated with said kinescope for producing elemental area illumination of the received picture in different primary colors in a repeating color pattern, a cathode ray control tube, means for producing therein a control electron beam, means for deflecting said beam in synchronism with the first said beam, a conducting target electrode associated therewith having openings corresponding in position to elemental areas of said color pattern, means for producing a control wave having peaks responsive to the passage of said control beam over the conducting portions of said target electrode, a local source of oscillations of the frequency of said control wave, means for comparing the phase of said control wave and said oscillations, and means for controlling said deflection voltage in accordance with the phase difference between said control wave and said oscillations.

19. In a color television system in which elemental areas of each line of the picture are transmitted as primary color light intensity signals separated by pulses of greater amplitude than any light signal, in combination, a kinescope having means for producing therein an electron beam, means for deflecting said beam, said means including a deflection circuit producing a deflection voltage, means associated with said kinescope for producing elemental area illumination of the received picture in different primary colors in a repeating color pattern, a cathode ray control tube, means for producing therein a control electron beam, means for deflecting said beam in synchronism with the first said beam, a conducting target electrode associated therewith having openings corresponding in position to elemental areas of said color pattern, means for producing a control wave having peaks responsive to the passage of said control beam over the conducting portions of said target electrode, a local source of oscillations of the frequency of said control wave, a phase comparator, means for supplying to said phase comparator said control wave and said oscillations and means for controlling said deflection voltage in accordance with the phase difference between said control wave and said oscillations.

20. In a color television system in which elemental areas of each line of the picture are transmitted as primary color light intensity signals separated by pulses of greater amplitude than any light signal, in combination, a kinescope having means for producing therein an electron beam, means for deflecting said beam, said means including a deflection circuit having an amplifier producing a deflection voltage, means associated with said kinescope for producing elemental area illumination of the received picture in different primary colors in a repeating color pattern, a cathode ray control tube, means for producing therein a control electron beam, means for deflecting said beam in synchronism with the first said beam, a conducting target electrode associated therewith having openings corresponding in position to elemental areas of said color pattern, means for producing a control wave having peaks responsive to the passage of said control beam over the conducting portions of said target electrode, a local source of oscillations of the frequency of said control wave, a phase comparator, means for supplying said phase comparator with said control wave and said oscillations, and means for controlling the gain of said amplifier in accordance with the phase difference between said control wave and said oscillations.

21. In a color television system in which elemental areas of each line of the picture are transmitted as primary color light intensity signals separated by pulses of greater amplitude than any light signal, in combination, a kinescope having means for producing therein an electron beam, means for deflecting said beam, said means including a deflection circuit producing a deflection voltage, means associated with said kinescope for producing elemental area illumination of the received picture in different primary colors in a repeating color pattern characterized by vertical stripes of primary colors, a cathode ray control tube, means for producing therein a control electron beam, means for deflecting said beam in synchronism with the first said beam, a conducting target electrode associated therewith having slits corresponding in position to the stripes of said color pattern, means for producing a control wave having peaks responsive to the passage of said control beam over the conducting portions of said target electrode, a local source of oscillations of the frequency of said control wave, means for comparing the phase of said control wave and said oscillations, and means for controlling the gain of said amplifier in accordance with the phase difference between said control wave and said oscillations.

22. In a color television system in which the elemental areas of each line of the picture are transmitted as primary color light intensity signals separated by pulses of greater amplitude than any light signal, in combination, a kinescope having means for producing therein an electron beam, means for deflecting said beam, said means including a deflection circuit producing a deflection voltage, means associated with said kinescope for producing elemental area illumination of the received picture in different primary colors in a repeating color pattern characterized by vertical stripes of primary colors, a cathode ray control tube, means for producing therein a control electron beam, means for deflecting said beam in synchronism with the first said beam, a conducting target electrode associated therewith having slits corresponding in position to the stripes of said color pattern, means for producing a control wave responsive to the passage of said control beam over the conducting portions of said target electrode, a local source of oscillations of the frequency of said control wave, a phase comparator, means for supplying said control wave and said oscillations to said phase comparator, and means for controlling said deflection voltage in accordance with the phase difference between said control wave and said oscillations.

23. In a color television system in which elemental areas of each line of the picture are transmitted as primary color light intensity signals separated by pulses of greater amplitude than any light signal, in combination, a kinescope having means for producing therein an electron beam, means for deflecting said beam, said means including a deflection circuit having an amplifier producing a deflection voltage, means associated with said kinescope for producing elemental area illumination of the received picture in different primary colors in a repeating color pattern characterized by vertical stripes, a cathode ray control tube, means for producing therein a control electron beam, means for deflecting said beam in synchronism with the first said beam, a conducting target electrode associated therewith having slots corresponding in position to the stripes of said color pattern, means for producing a control wave having peaks responsive to the passage of said control beam over the conducting portions of said target electrode, a local source of oscillations of the frequency of said control wave, a phase comparator, means for supplying said phase comparator with said control wave and said oscillations, and means for controlling the gain of said amplifier in accordance with the phase difference between said control wave and said oscillations.

24. In a color television system in which elemental areas of each line of the picture are transmitted as primary color light intensity signals separated by pulses of greater amplitude than any light signal, in combination, a kinescope having means for producing therein an electron beam, means for deflecting said beam in two directions at substantially right angles, said means including a vertical deflection circuit, and a horizontal deflection circuit each producing a deflecting voltage, means associated with said kinescope for producing in different primary colors in a repeating color pattern, a first cathode ray control tube, means for producing therein a first control electron beam, means for deflecting said beam in synchronism with the deflection of the first said beam in one direction, a second cathode ray control tube, means for producing therein a second control electron beam, means for deflecting said second control electron beam in synchronism with the deflection of the first said beam in the other direction, a conducting target electrode associated with each of said control tubes, each target having openings therein corresponding in position to elemental areas of said color pattern in one deflection direction, means for producing control waves from each of said control tubes having peaks responsive to the passage of the respective control beam over the conducting portions of the respective target electrode, a local source of oscillations of the frequency of the first control wave, a local source of oscillations of the frequency of the second control wave, means for comparing the phase of the first control wave and the first oscillations, means for comparing the phase of the second control wave and the second oscillations, and means for controlling the respective deflection voltages in accordance with the respective phase differences between said respective control waves and said respective local oscillations.

25. In a television transmitter, in combination, an image transducer tube having means for producing therein an electron beam, means for deflecting said beam comprising a circuit producing a deflection voltage, a cathode ray control tube having means for producing therein a control electron beam, means for deflecting said control beam in synchronism with the first said beam, means associated with said control tube for producing therefrom a control wave the frequency of which varies with the speed of deflection of said control beam, a local source of oscillations of predetermined frequency corresponding to the desired deflection speed of said control beam, means for comparing the phase of said control wave and said local oscillations, and means for controlling said deflection voltage in accordance with the phase difference between said control wave and said local oscillations.

26. In a color television transmitter, in combination, an image transducer tube having means for producing therein an electron beam, means for deflecting said beam, comprising a circuit producing a deflection voltage, means associated with said image transducer tube for producing an image to be transmitted having elemental areas thereof in primary colors in a repeating color pattern, a cathode ray control tube having means for producing therein an electron beam, means associated therewith for producing a control wave the frequency of which varies with the speed of deflection of said control beam, a local source of oscillations of a predetermined frequency corresponding to the number of primary color elements per unit of time of the image to be transmitted, means for comparing the phase of said control wave and said local oscillations, and means for controlling said deflection voltage in accordance with the phase difference between said control wave and said oscillations.

27. In a color television receiver, in combination, a kinescope having means for producing therein an electron beam, means for deflecting said beam, comprising a circuit producing a deflecting voltage, means associated with said kinescope for producing elemental area illumination of the received picture in different primary colors in a repeating color pattern, a cathode ray control tube, means for producing therein a control electron beam, means for deflecting said beam in synchronism with the first said beam, means associated therewith for producing a control wave the frequency of which varies with the speed of deflection of said control beam, means for delivering oscillations of a frequency corresponding to the number of elemental color areas per unit of time in the received picture, means for comparing the phase of said control wave and of said oscillations and means for controlling said deflecting voltage in accordance with the phase difference between said control wave and said oscillations.

28. In a color television receiver for receiving signals in which elemental areas of each line of the picture are transmitted as primary color light intensity signals separated by pulses of greater amplitude than any light signal, in combination, a kinescope having means for producing therein an electron beam, means for deflecting said beam, said means including a circuit producing a deflection voltage, means associated with said kinescope for producing elemental area illumination of the received picture in different primary colors, a control cathode ray tube, means for producing therein a control electron beam, means for deflecting said control beam in synchronism with said first beam, means associated with said control tube for producing a control wave the frequency of which varies with the speed of deflection of said control beam, a source of local oscillations, means for synchronizing said oscillations with incoming signal separation pulses, means for comparing the phase of said control wave and said oscillations, and means for controlling said deflection voltage, in accordance with the phase difference between said control wave and said oscillations.

29. In a color television receiver for receiving signals in which elemental areas of each line of the picture are transmitted as primary color light intensity signals separated by pulses of greater amplitude than any light signal, in combination, a kinescope having means for producing therein an electron beam, means for deflecting said beam, said means including a circuit having an amplifier producing a deflection voltage, means associated with said kinescope for producing elemental area illumination of the received picture in different primary colors, a control cathode ray tube, means for producing therein a control electron beam, means for deflecting said control beam in synchronism with the first said beam, means associated with said control tube for producing a control wave the frequency of which varies with the speed of deflection of said control beam, a source of local oscillations, means for synchronizing said oscillations with incoming signal separation pulses, means for comparing the control wave and said oscillations, and means for varying the gain of said amplifier in accordance with the phase difference between said control wave and said oscillations.

30. In a television system, a control tube having means for producing therein an electron beam in line deflection direction, means for periodically deflecting said beam, means responsive to instantaneous departures of deflection speed of said beam from desired values to introduce a speed correction to maintain the desired speed, means responsive to arrival of said beam at a predetermined end deflection position, for initiating fly-back of said beam, and means responsive to a shift in position of the raster of said tube for introducing a correcting shift for maintaining said raster in a desired position, said last mentioned three means comprising conducting electrodes positioned within said tube and impinged upon by said beam at predetermined positions thereof.

31. In an electronic control system, a vacuum tube having means for producing therein an electron beam, means for deflecting said beam periodically, said means including a deflection circuit delivering a periodically varying deflection voltage, means for producing from said beam a control wave having a multiplicity of periodic peaks for each excursion cycle of said beam, a source of oscillations of the frequency of said control wave, and means for controlling the amplitude of said deflecting voltage in accordance with the phase difference between said contral wave and said oscillations to maintain the desired instantaneous scanning position of said beam.

32. In an electronic control system, a vacuum tube having means for producing an electron beam, means for deflecting said beam periodically, said means including a deflection circuit delivering a periodically varying deflection voltage, means for producing from said beam a control wave having a multiplicity of periodic peaks for each excursion cycle of said beam, a local source of oscillations of the frequency of said control wave, a phase comparator, means for actuating said phase comparator by said control wave and said oscillations and means for controlling the amplitude of said deflection voltage in accordance with the output of said phase comparator.

33. In an electronic control system, a vacuum tube having means for producing therein an electron beam, means for deflecting said beam, said means including a deflection circuit delivering a periodically varying deflection voltage, means for producing from said beam a control wave having a series of periodic peaks responsive to impingement of said beam on a series of predetermined points across the deflection path thereof, an oscillation generator generating oscillations of control wave frequency, a phase comparator, means for actuating said phase comparator by said control wave and said oscillations, and means for controlling the amplitude of said deflection voltage in accordance with the output of said phase comparator.

34. In an electronic control system, a vacuum tube having means for producing therein an electron beam, means for deflecting said beam, said means including a deflection circuit embodying a vacuum tube amplifier having a control electrode and delivering a periodically varying deflection voltage, means for producing from said beam a control wave having a series of periodic peaks responsive to the successive passage of said control beam across predetermined poins in the deflection path thereof, a local source of oscillations of the frequency of said control wave, a phase comparator, means for actuating said phase comparator by said control wave and said oscillations, and means for controlling the gain of said amplifier in accordance with the output of said comparator.

35. In an electronic control system, a vacuum tube having means for producing therein an electron beam, means for deflecting said beam periodically, said means including a deflection circuit delivering a periodically varying deflection voltage, means for producing from said beam a control wave having a multiplicity of periodic peaks for each excursion cycle of said beam, said last mentioned means including a target electrode in the path of said beam having a multiplicity of openings therein in a predetermined pattern, means for producing oscillations of the frequency of said control wave, and means for controlling the amplitude of said deflection voltage in accordance with the phase difference between said control wave and said oscillations to maintain the desired instantaneous scanning position of said beam.

36. In an electronic control system, a vacuum tube having means for producing therein an electron beam, means for deflecting said beam periodically, said means including a deflection circuit delivering a periodically varying deflection voltage, means for producing from said beam a control wave having a multiplicity of periodic peaks for each excursion cycle of said beam, said last mentioned means including a target electrode in said tube having a multiplicity of openings therein in a predetermined pattern, means for producing oscillations of the frequency of said control wave, a phase comparator, means for supplying said phase comparator with said control wave and said oscillations, and means for controlling the amplitude of said deflection voltage in accordance with the output of said phase comparator.

37. In an electronic control system, a vacuum tube having means for producing therein an electron beam, means for deflecting said beam periodically, said means including a deflection circuit having an amplifier delivering a periodically varying deflection voltage, means for producing from said control beam a control wave having a multiplicity of periodic peaks for each excursion cycle of said beam, said last mentioned means including a target electrode within said tube having a multiplicity of openings arranged in a predetermined pattern, means for producing oscillations of the frequency of said control wave, a phase comparator, means for supplying said phase comparator with said control wave and said oscillations, and means for controlling the gain of said amplifier in accordance with the output of said phase comparator.

38. The method of controlling the deflection of an electron beam which comprises generating a periodically deflecting voltage, deflecting said beam by said voltage, producing from said beam a control wave having a multiplicity of periodic peaks for each excursion cycle of said control beam, producing oscillations of the frequency of the control wave, and controlling the magnitude of said deflection voltage in accordance with the phase difference between said control wave and said oscillations.

39. The method of controlling the deflection of an electron beam which comprises generating a periodically varying deflecting voltage, deflecting said beam by said voltage, producing a control wave having a multiplicity of periodic peaks for each excursion cycle of said control beam, producing oscillations of the frequency of the control wave, and controlling the magnitude of said deflection voltage in accordance with the phase difference between said control wave and said oscillations.

40. The method of controlling the deflection of an electron beam which comprises generating a periodically varying deflecting voltage deflecting said beam by said voltage producing a control wave having a multiplicity of periodic peaks for each excursion cycle of said control beam producing oscillations of the frequency of said control wave deriving from said control wave and said oscillations, a control voltage proportional to the phase difference between said control wave and said oscillations and controlling the magnitude of said deflection voltage in accordance with said control voltage.

41. The method of controlling the deflection of an electron beam which comprises generating a periodically varying deflecting voltage deflecting said beam by said voltage producing a control wave having a multiplicity of periodic peaks for each excursion cycle of said control beam, said peaks being respectively responsive to passage of said beam across predetermined points in the deflection path thereof producing oscillations of the frequency of said control wave deriving from said wave and said oscillations, a control voltage proportional to the phase difference between said wave and said oscillations and dependent in sign on the relative lag and lead thereof and controlling the magnitude of said deflection voltage in accordance with said control voltage.

42. The method of controlling the deflection of an electron beam which comprises generating a deflecting voltage, amplifying said voltage deflecting said beam by said voltage, producing a control wave having peaks responsive to the passage of said control beam across predetermined points in the deflection path thereof, producing oscillations of the frequency of said control wave, and deriving from said wave and said oscillations a control voltage proportional to the phase difference between said control wave and said oscillations, and controlling the amplification of said deflection voltage in accordance with said control voltage.

43. In a television receiver, a kinscope having a screen and means for producing therein an electron beam, means for deflecting said beam periodically, said means including a deflection circuit delivering a periodically varying deflection voltage, means for producing from said beam a control wave having a multiplicity of periodic peaks for each excursion cycle of said beam, said last mentioned means including a conducting grid in the deflection path of said beam, a source of oscillations of the frequency of said control wave, and means for controlling the amplitude of said deflecting voltage in accordance with the phase difference between said control wave and said oscillations to maintain the desired instantaneous scanning position of said beam, and said grid covering the entire raster of said tube and being so constructed as to permit visual observation of the reproduced transmitted picture thereon.

44. In an electronic control system, a vacuum tube having means for producing therein an electron beam, a light producing screen therein scanned by said beam, means for deflecting said beam periodically, said means including a deflection circuit delivering a periodically varying deflection voltage, a mask on said screen having a multiplicity of openings therein in the path of said beam, a photo electric cell for receiving light from said screen, means for producing from the output of said photo electric cell a control wave having a multiplicity of periodic peaks for each excursion cycle of said beam, a source of oscillations of the frequency of said control wave, and means for controlling the amplitude of said deflecting voltage in accordance with the phase difference between said control wave and said oscillations to maintain the instantaneous scanning position of said beam.

45. In an electronic control system, a vacuum tube having means for producing therein an electron beam, a light producing screen therein scanned by said beam, means for deflecting said beam periodically, said means including a deflection circuit delivering a periodically varying deflection voltage, a mask on said screen having a multiplicity of openings therein in the path of said beam, a photo electric cell for receiving light from said screen, means for producing from the output of said photo electric cell a control wave having a multiplicity of periodic peaks for each excursion cycle of said beam, a source of oscillations of the frequency of said control wave, a phase comparator, means for actuating said phase comparator by said control wave and said oscillations, and means for controlling the amplitude of said deflection voltage in accordance with the output of said phase comparator.

46. In an electronic control system, a vacuum tube having means for producing therein an electron beam, a light producing screen therein scanned by said beam, means for deflecting said beam periodically, said means including a deflection circuit delivering a periodically varying deflection voltage, a mask on said screen having a multiplicity of openings therein in the path of said beam, a photo electric cell receiving light from said screen, means for producing from the output of said photo electric cell a control wave having a series of periodic peaks responsive to impingement of said beam on a series of predetermined points across the deflection path thereof, a source of oscillations of the frequency of said control wave, a phase comparator, means for actuating said phase comparator by said control wave and said oscillations, and means for controlling the amplitude of said deflection voltage in accordance with the output of said phase comparator.

47. In an electronic control system, a vacuum tube having means for producing therein an electron beam, a light producing screen therein scanned by said beam, means for deflecting said beam periodically, said means including a deflection circuit embodying a vacuum tube amplifier having a control electrode and delivering a periodically varying deflection voltage, a mask on said screen having a plurality of openings therein in the path of said beam, a photo electric cell for receiving light from said screen, means for producing from the output of said photo electric cell a control wave having a multiplicity of periodic peaks for each excursion cycle of said beam, a source of oscillations of the frequency of said control wave, a phase comparator actuated by said control wave and the output of said oscillator, and means for controlling the gain of said amplifier in accordance with the output of said phase comparator.

48. The method of controlling the deflection of an electron beam which comprises generating a periodically deflecting voltage, deflecting said beam by said voltage, producing from said beam light having a multiplicity of periodic interruptions for each excursion cycle of said beam, deriving from said light an electric wave having a plurality of periodic peaks for each excursion cycle of said beam, producing oscillations of the frequency of said wave, and controlling the magnitude of said deflection voltage in accordance with the phase difference between said wave and said oscillations.

49. The method of controlling the deflection of an electron beam which comprises generating a periodically deflecting voltage, deflecting said beam by said voltage, producing from said beam light having a multiplicity of periodic interruptions responsive to impingement of said beam on a series of predetermined points across the deflection path thereof, deriving from said light an electric wave having the frequency of interruptions of said light, producing oscillations of the frequency of said wave, and controlling the magnitude of said deflection voltage in accordance with the phase difference between said wave and said oscillations.

50. The method of controlling the deflection of an electron beam which comprises generating a periodically deflecting voltage, amplifying said voltage, deflecting said beam by said amplified voltage, producing from said beam light having a multiplicity of periodic interruptions responsive to impingement of said beam on a series of predetermined points across the deflection path thereof, deriving from said light an electric wave having a plurality of periodic peaks of the frequency of said interruptions, producing oscillations of the frequency of said wave, and controlling the amplification of said voltage in accordance with the phase difference between said wave and said oscillations.

51. In an electronic scanning control system, a vacuum tube having means for producing therein an electron beam, means for deflecting said beam periodically in line scanning direction, said means including a deflection circuit delivering a periodically varying deflection voltage, means for producing from said beam a control wave having a multiplicity of periodic peaks for each line excursion cycle of said beam, a source of oscillations of the frequency of said control wave, and means for controlling the amplitude of said deflecting voltage in accordance with the phase difference between said control wave and said oscillations to maintain the desired instantaneous line scanning position of said beam.

52. In an electronic scanning control system, a vacuum tube having means for producing therein an electron beam, means for deflecting said beam periodically in a frame scanning direction, said means including a deflection circuit delivering a periodically varying deflection voltage, means for producing from said beam a control wave having a multiplicity of periodic peaks for each frame excursion cycle of said beam, a source of oscillations of the frequency of said control wave, and means for controlling the amplitude of said deflecting voltage in accordance with the phase difference between said control wave and said oscillations to maintain the desired instantaneous frame scanning position of said beam.

53. In an electronic scanning control system, a vacuum tube having means for producing therein an electron beam, means for deflecting said beam periodically in line scanning direction, said means including a deflection circuit, having a variable gain amplifier delivering a periodically varying deflection voltage, means for producing from said beam a control wave having a multiplicity of periodic peaks for each line excursion cycle of said beam, a source of oscillations of the frequency of said control wave, and means for controlling the gain of said amplifier in accordance with the phase difference between said control wave and said oscillations to maintain the desired instantaneous line scanning position of said beam.

54. In an electronic scanning control system, a vacuum tube having means for producing therein an electron beam, means for deflecting said beam periodically in a frame scanning direction, said means including a deflection circuit having a variable gain amplifier delivering a periodically varying deflection voltage, means for producing from said beam a control wave having a multiplicity of periodic peaks for each frame excursion cycle of said beam, a source of oscillations of the frequency of said control wave, and means for controlling the gain of said amplifier in accordance with the phase difference between said control wave and said oscillations to maintain the desired instantaneous frame scanning position of said beam.

55. In a television receiver, a vacuum tube having means for producing therein an electron beam, means for deflecting said beam periodically in a line scanning direction, said means including a deflection circuit delivering a periodically varying deflection voltage, means for producing from said beam a control wave having a multiplicity of periodic peaks for each line excursion cycle of said beam, a source of oscillations of the frequency of said control wave synchronized with received intraline blanking pulses, and means for controlling the amplitude of said deflecting voltage in accordance with the phase difference between said control wave and said oscillations to maintain the desired instantaneous line scanning position of said beam.

56. In a television receiver, a vacuum tube having means for producing therein an electron beam, means for deflecting said beam periodically in a frame scanning direction, said means including a deflection circuit delivering a periodically varying deflection voltage, means for producing from said beam a control wave having a multiplicity of periodic peaks for each frame excursion cycle of said beam, a source of oscillations of the frequency of said ccntrol wave synchronized with received line synchronizing pulses, and means for controlling the amplitude of said deflecting voltage in accordance with the phase difference between said control wave and said oscillations to maintain the desired instantaneous frame scanning position of said beam.

References Cited in the file of this patent

UNITED STATES PATENTS

| | | |
|---|---|---|
| 2,375,966 | Valensi | May 15, 1945 |
| 2,398,641 | Homrighous | Apr. 16, 1946 |
| 2,399,421 | Artzt | Apr. 30, 1946 |
| 2,415,059 | Zworykin | Jan. 28, 1947 |
| 2,438,928 | Labin | Apr. 6, 1948 |
| 2,480,130 | Grieg | Aug. 30, 1949 |
| 2,492,926 | Valensi | Dec. 27, 1949 |
| 2,530,431 | Huffman | Nov. 21, 1950 |
| 2,545,325 | Weimer | Mar. 13, 1951 |
| 2,550,821 | Kharbanda | May 1, 1951 |
| 2,558,489 | Kalfaian | June 26, 1951 |
| 2,568,543 | Goldsmith | Sept. 18, 1951 |
| 2,587,074 | Sziklai | Feb. 26, 1952 |
| 2,624,797 | Lawson | Jan. 6, 1953 |
| 2,647,944 | Robinson | Aug. 4, 1953 |
| 2,653,184 | Robinson | Sept. 22, 1953 |